United States Patent
Geraghty et al.

(10) Patent No.: US 11,688,084 B1
(45) Date of Patent: *Jun. 27, 2023

(54) ARTIFICIAL REALITY SYSTEM WITH 3D ENVIRONMENT RECONSTRUCTION USING PLANAR CONSTRAINTS

(71) Applicant: Meta Platforms Technologies, LLC, Menlo Park, CA (US)

(72) Inventors: David James Geraghty, Seattle, WA (US); Richard Szeliski, Bellevue, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/370,761

(22) Filed: Jul. 8, 2021

Related U.S. Application Data

(63) Continuation of application No. 16/722,391, filed on Dec. 20, 2019, now Pat. No. 11,087,479.

(51) Int. Cl.
*G06T 7/60* (2017.01)
*G06T 15/20* (2011.01)
(Continued)

(52) U.S. Cl.
CPC .............. *G06T 7/38* (2017.01); *G06T 7/60* (2013.01); *G06T 15/205* (2013.01); *G06T 19/006* (2013.01)

(58) Field of Classification Search
CPC ............ G06F 2111/18; G06F 3/0481; G06F 3/04817; G06F 9/4443; G06F 3/04847; G06F 11/3664; G06F 3/012; G06F 3/0304; G06F 3/011–015; G06K 9/00664–00704; G06T 19/00; G06T 17/00; G06T 7/00; G06T 19/006;
(Continued)

(56) References Cited

U.S. PATENT DOCUMENTS 11,087,479 B1* 8/2021 Geraghty ................ G06T 17/00
2006/0216037 A1* 9/2006 Wiessner .............. H01S 3/0057
398/161

(Continued)

OTHER PUBLICATIONS

U.S. Appl. No. 16/722,391, filed Dec. 20, 2019, naming inventors Geraghty et al.

*Primary Examiner* — Todd Buttram
(74) *Attorney, Agent, or Firm* — Shumaker & Sieffert, P.A.

(57) ABSTRACT

An artificial reality system is configured to more accurately and efficiently construct a 3D virtual representation of a real-world environment from a set of 2D images. The system identifies points and/or lines within the images that define a plane along an orientation and then performs a planar sweep along a perpendicular path to identify surfaces in which the plane intersects with multiple points. Points that appear to be in the same plane are "collapsed" into a cohesive plane to conserve processing power by estimating and/or storing parameters for the cohesive plane, rather than all of the individual 3D points. In this way, the system also "averages out" random variation in the planar surface that would otherwise result from random noise in the estimation of the individual 3D points. The system may then generate a 3D map from a constrained alignment of all of the identified planes.

20 Claims, 13 Drawing Sheets

(51) Int. Cl.
*G06T 19/00* (2011.01)
*G06T 7/38* (2017.01)

(58) Field of Classification Search
CPC ............... G06T 2215/16; H04N 5/272; H04N 2201/3245; A63F 13/10
See application file for complete search history.

(56) References Cited

U.S. PATENT DOCUMENTS

2017/0039731 A1* 2/2017 Liu ........................... G06T 7/75
2019/0362546 A1* 11/2019 Wayenberg ............. G06T 17/20

* cited by examiner

ARTIFICIAL REALITY SYSTEM WITH 3D ENVIRONMENT RECONSTRUCTION USING PLANAR CONSTRAINTS

This application is a continuation of U.S. patent application Ser. No. 16/722,391, entitled "Artificial Reality System With 3D Environment Reconstruction Using Planar Constraints," and filed on Dec. 20, 2019, the entire contents of which are incorporated herein by reference.

TECHNICAL FIELD

This disclosure generally relates to artificial reality systems, such as virtual reality, mixed reality and/or augmented reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems use one or more devices for interacting with the system and rendering and displaying content to one or more users. As one example, an artificial reality system may incorporate a head-mounted display (HMD) worn by a user and configured to output artificial reality content to the user. As another example, an artificial reality system may output content for display by a tablet computer, mobile phone, or other device having a non-HMD form factor. The artificial reality content may include completely-generated content or generated content combined with captured content (e.g., real-world video and/or images).

SUMMARY

In general, this disclosure describes an artificial reality system configured to more-accurately construct a 3D virtual representation of a real-world environment from a series of 2D images of the environment. The system constructs a 3D "cloud" of matching points and/or lines between the 2D images and then performs a "planar sweep" through the points or lines in order to identify one or more subsets of points that collectively define relatively (or "approximate") planar surfaces within the point cloud. The system may identify planes in multiple directions, e.g., 3 or 6 in the case of an urban "Manhattan"-type world defined by large planar surfaces that are substantially perpendicular to one another.

According to the techniques of this disclosure, points that appear to be in approximately the same plane are "collapsed" or "locked" into a cohesive plane. In this way, the system may conserve processing power by estimating and/or storing parameters for the single cohesive plane, rather than all of the individual 3D points that make up the approximate plane. Additionally, by estimating parameters of the cohesive plane rather than the individual 3D points, the system reduces random variation in the planar surface that would otherwise result from noise from the individually estimated positions of the 3D points.

The identified planes may then be used as environmental constraints within the 3D reconstruction pipeline. For example, a camera position for each of the 2D images may be known such that a distance between the camera and the identified planes is also known. The system may use the known distances between the camera and the identified planes as additional constraints used to better estimate camera locations to create a global-level map of the environment. These additional constraints essentially use the identified planes to anchor the cameras in the environment.

As a more specific example, the system is configured to receive a triplet (i.e., three 2D images that have some overlap) of a portion of a 3D environment captured by cameras at different positions. The system identifies common points between the images and, based on the relative distances from each camera to each point, the system identifies at least one planar surface defined by a subset of the points (e.g., all points within a threshold distance of the planar surface). Then, the system is configured to construct a 3D "map" representative of the 3D environment by linking identified planar surfaces across sets of triplets. For example, the system may be configured to match common points between different sets of triplets to "stitch" the locally identified planes into larger "global" planes within the 3D environment.

In one example, this disclosure describes an artificial reality system including an image capture device configured to capture image data representative of a real world environment; and a mapping engine configured to: construct a 3D point cloud comprising a plurality of points from the image data; define a first planar surface and a first axis orthogonal to the first planar surface; perform a planar sweep of the first planar surface along the first axis through the plurality of points to identify a first subset of points that intersect with the first planar surface; define a cohesive planar surface based on the first subset of points; determine planar constraints based on a distance between the at least one image capture device and the cohesive planar surface; and generate a 3D virtual map of the real world environment based at least in part on the planar constraints.

In another example, this disclosure describes a method including: constructing, by a mapping engine, a 3D point cloud comprising a plurality of points from image data representing a real-world environment; defining a first planar surface and a first axis orthogonal to the first planar surface; performing a planar sweep of the first planar surface along the first axis though the plurality of points to identify a second subset of points that intersect with the first planar surface; defining a cohesive planar surface based on the first subset of points; determining planar constraints based on a distance between the at least one image capture device and the cohesive planar surface; and generating a 3D virtual map of the real world environment based at least in part on the planar constraints.

In another example, this disclosure describes a non-transitory computer-readable medium comprising instructions for causing one or more processors of an artificial reality system to perform operations including constructing, by a mapping engine, a 3D point cloud comprising a plurality of points from image data representing a real-world environment; defining a first planar surface and a first axis orthogonal to the first planar surface; performing a planar sweep from of the first planar surface along the first axis through the plurality of points to identify a first subset of points that intersect with the first planar surface; defining a cohesive planar surface based on the first subset of points; determining planar constraints based on a distance between the at least one image capture device and the cohesive planar surface; and generating a 3D virtual map of the real world environment based at least in part on the planar constraints.

The details of one or more examples of the techniques of this disclosure are set forth in the accompanying drawings and the description below. Other features, objects, and advantages of the techniques will be apparent from the description and drawings, and from the claims.

BRIEF DESCRIPTION of DRAWINGS

Like reference characters refer to like elements throughout the figures and description.

DETAILED DESCRIPTION

Figure 1:
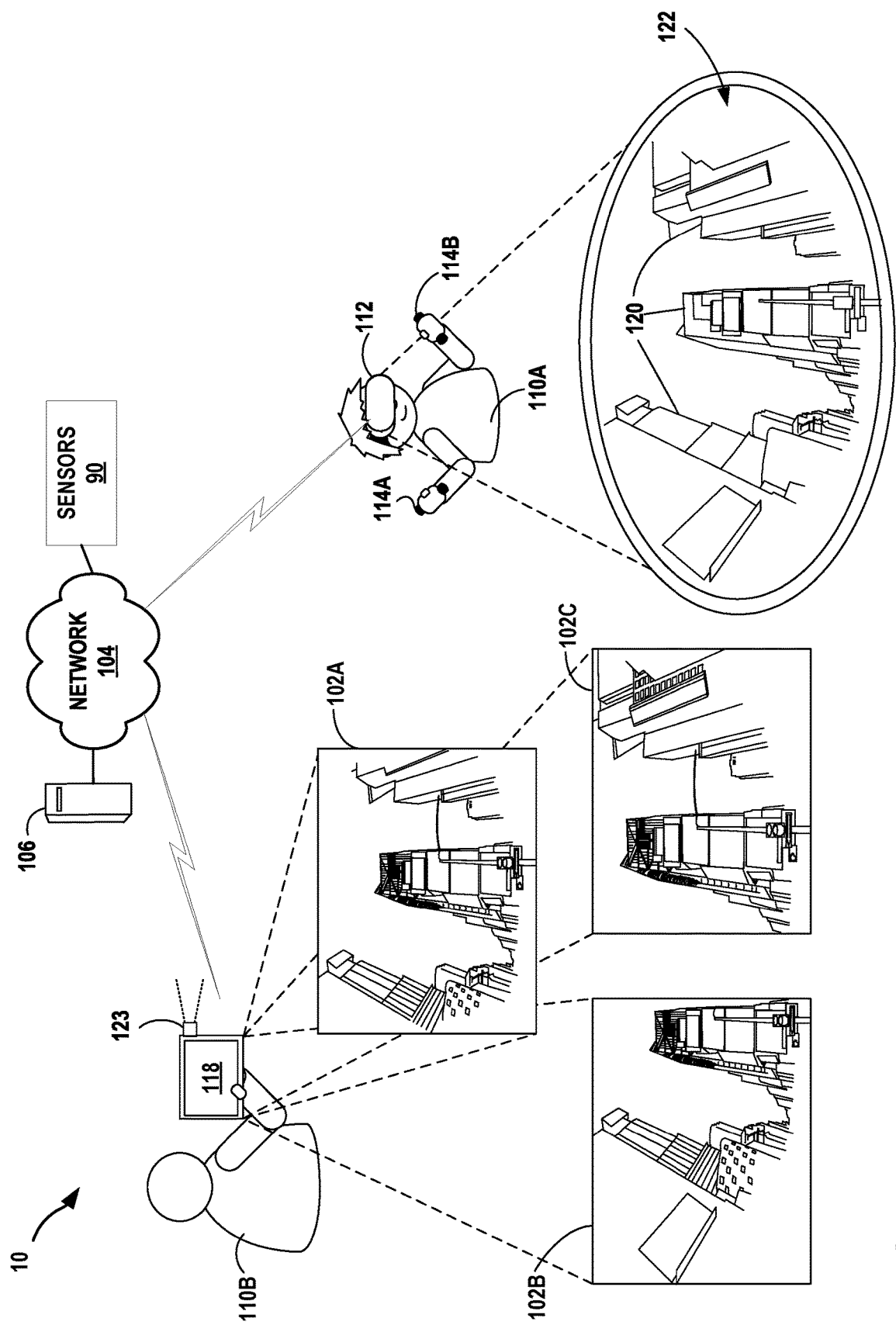
FIG. 1 is an illustration depicting an example artificial reality system in accordance with the techniques of the disclosure.

FIG. 1 is an illustration depicting an example artificial reality system 10 configured to generate 3D virtual map based at least in part on a set of 2D images of a real-world environment, in accordance with the techniques of the disclosure.

In the example of FIG. 1, artificial reality system 10 includes head-mounted display (HMD) 112, optional controllers 114A-114B (collectively, "controllers 114") for HMD 112, console 106, user device 118, and, in some examples, one or more sensors 90. As shown, HMD 112 is typically worn by user 110A and includes an electronic display and optical assembly for presenting artificial reality content 122, having one or more virtual objects 120, to the user. In addition, HMD 112 may include one or more sensors (e.g., accelerometers) for tracking motion of the HMD and includes one or more image capture devices, e.g., cameras, line scanners and the like, for capturing image data of the surrounding environment. Each controller 114 is an input device which user 110A may use to provide input to console 106, HMD 112, or another component of artificial reality system 10. In other examples, AR system 10 may operate without the use of hand-held controllers 114.

As shown in FIG. 1, artificial reality system 10 represents a multi-user environment in which an artificial reality application executing on console 106 and/or HMD 112 may present artificial reality content to each of users 110A, 110B (collectively, "users 110") based on a current viewing perspective of a corresponding frame of reference for the respective user. That is, in this example, the artificial reality application constructs artificial content by tracking and computing pose information for a frame of reference for HMD 112. Artificial reality system 10 uses data received from image capture device 123, HMD 112, and controllers 114 to capture 3D information within the real world environment, such as motion by users 110 and/or tracking information with respect to users 110, for use in computing updated pose information for a corresponding frame of reference of HMD 112. As one example, the artificial reality application may render, based on a current viewing perspective determined for HMD 112, artificial reality content 122 having virtual objects 120 as spatially overlaid upon real world objects.

Figure 5:
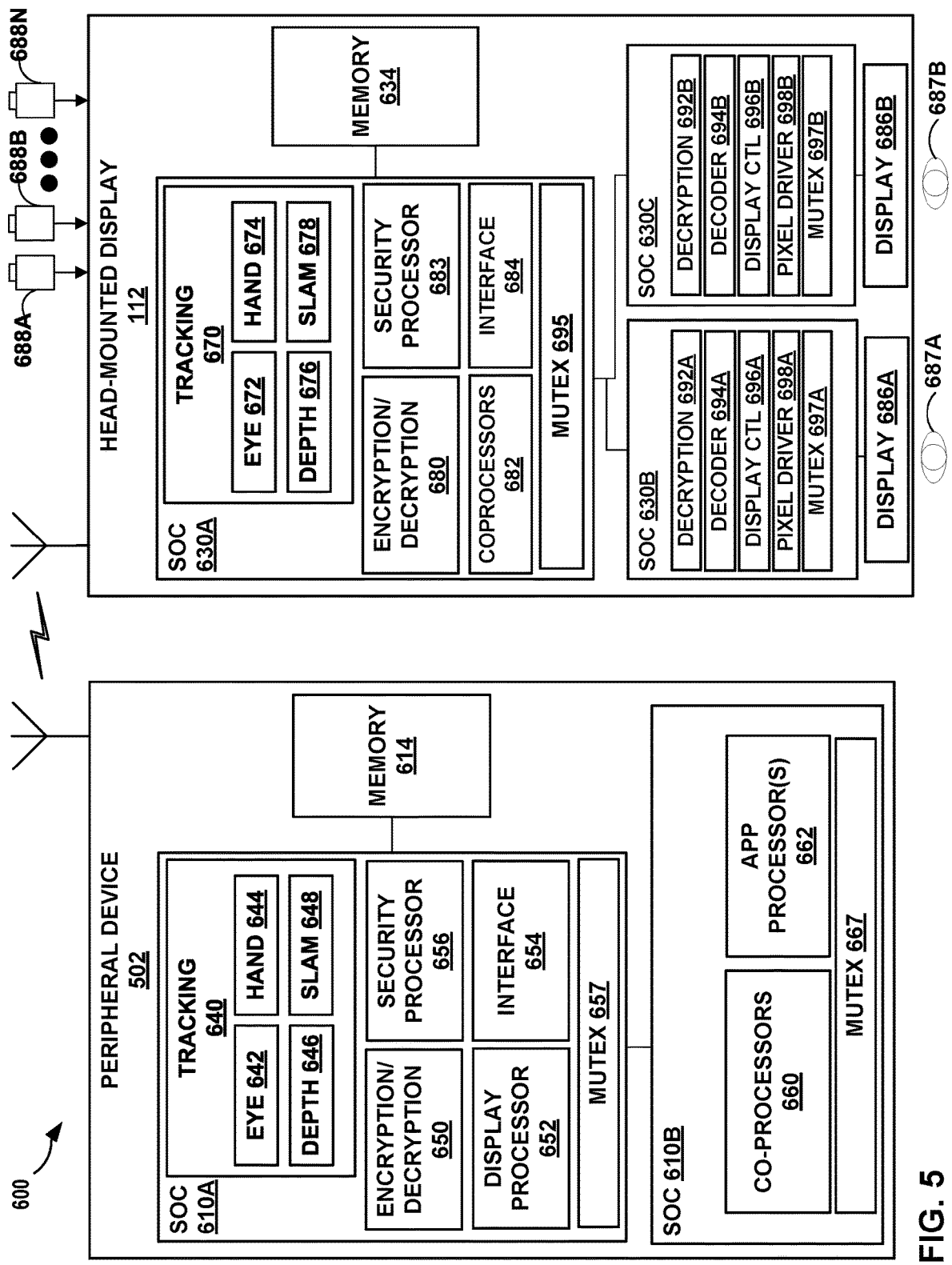
FIG. 5 is a block diagram depicting an example multiple-device artificial reality system, in accordance with techniques of this disclosure.

In general, artificial reality system 10 uses information obtained from a real-world or physical, three-dimensional (3D) environment to render artificial reality content 122 for display by HMD 112 to user 110A (and/or by user device 118 to user 110B). In the example of FIG. 1, user 110A views the artificial reality content 122 constructed and rendered by an artificial reality application executing on a computing device, such as console 106, HMD 112, and/or a peripheral computing device (FIG. 5). Artificial reality content 122A may be based at least in part on a set of 2D images 102A-102C, captured, for example, by an image capture device (ICD), such as ICD 123 of user device 118, or one or more ICDs built into HMD 112 or included in sensors 90.

Artificial reality content 122 may be generated based on a 3D virtual map of any real-world environment, such as a metropolitan area, to include a set of virtual objects 120 representing buildings, such as skyscrapers. In other examples, artificial reality content may be generated based on a 3D virtual map of a single room within a building to include a set of virtual objects representing, for example, furniture within the room. In some examples, artificial reality content may include a mixture of real-world imagery and virtual objects, e.g., mixed reality and/or augmented reality. In a mixed reality example, artificial reality content may include virtual objects that are overlaid on pass-through images of real-world objects, e.g., skyscrapers, and the AR system may use the 3D virtual map of the real-world environment to align the virtual objects with the real-world objects. In other examples, artificial reality content may correspond to, e.g., a video conferencing application, a navigation application, an educational application, training or simulation applications, augmented reality application, virtual reality application, or other type of applications that implement artificial reality. As used in this disclosure, the phrase "A and/or B" may refer to A only, B only, or both A and B.

User device 118 may represent a laptop computer, mobile phone, personal digital assistant, tablet computer, HMD, smart goggles/glasses, camera, video camera, or other user device having an image-capture device 123 and a display by which user device 118 displays visual content to a user. User device 118 may have more limited input/output, tracking, or user interface device capabilities than HMD 112. For example, user device 118 may not enable tracking by sensors 90, may be unable to display artificial reality content using a 3D display device, may have a more limited image capture device 123 or no image capture device 123, or may have no accelerometers, global positioning system (GPS) sensors, or other devices by which the user device 118 may track a location or local pose within the physical 3D environment. User device 118 may not enable user inputs that result in event data for an artificial reality application executed by artificial reality system 10. User device 118 may not contribute tracking information, mapping information for the physical 3D environment, and/or event data for the artificial reality application. In some examples, user device 118 has similar input/output, tracking, or user interface capabilities as HMD 112 but is not configured to use the capabilities in conjunction with other components of artificial reality system 10. In the example of FIG. 1, user device 118 includes an image capture device 123, such as a camera, which generates 2D images of the physical 3D environment.

Both user device 118 and HMD 112 are "user devices," in that the devices are computing devices used by a user to interact with other components of artificial reality system 10. Artificial reality system 10 may, in other examples, include a set of one or more instances of HMDs 112 all operating concurrently within the physical 3D environment along with a set of one or more instances of user devices 118 also operating concurrently within the physical 3D environment.

In the example of FIG. 1, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, controllers 114, user device 118, and sensors 90 may, as shown in this example, be communicatively coupled via network 104, which may be a wired or wireless network, such as Wi-Fi, a mesh network, or a short-range wireless communication medium. Controllers 114 may be in communication with HMD 112 using near-field communication or short-range wireless communication such as Bluetooth, using wired communication links, or using another type of communication links. Although HMD 112 is shown in this example as being in communication with (e.g., tethered to or in wireless communication with) console 106, in some implementations HMD 112 operates as a stand-alone, mobile artificial reality system. As such, some or all functionality attributed to console 106 in this disclosure may be distributed among one or more user devices, such as one or more instances of HMD 112 and/or user device 118. Both console 106 and controllers 114 are optional, and in some examples, may not be included in artificial reality system 10.

In accordance with techniques described in this disclosure, artificial reality (AR) system 10 is configured to generate, based on a set of 2D images 102 of a real-world environment, a 3D virtual map of the real-world environment, and output artificial reality content 122 based on the 3D virtual map for display to user 110A. For example, one or more image-capture devices (ICDs) may capture at least two images, such as a "triplet" of three 2D images 102, depicting a real-world environment from different angles and/or depths. For example, a single ICD may be located in three different physical locations when capturing the 2D images 102, or multiple ICDs, each ICD present at a different physical location, may capture the respective 2D images 102. In some examples, an ICD may capture a relatively large number of images, and then identify two or more overlapping images 102 from within the larger set of images.

System 10 is configured to construct a 3D virtual map based on image data contained within the triplet of images 102. For example, AR system 10 may be configured to receive the triplet of overlapping 2D images 102, identify a set of feature points and/or lines within the images 102, match corresponding points and/or lines between the images, and construct a 3D "point cloud" of matched points.

In some examples in accordance with this disclosure, AR system 10 may further be configured to define one or more planar surfaces corresponding to a subset of points identified within the 3D point cloud of matched feature points. For example, system 10 may be configured to perform a "planar sweep" (e.g., dragging an imaginary plane) through the 3D point cloud to identify one or more subsets of points that define an approximately planar surface (e.g., a group of feature points all located within a threshold distance of a common planar surface). System 10 may then be configured to "collapse" the identified subset of points (e.g., the approximate planar surface) into an "ideal," "smooth," or "cohesive" planar surface. For example, System 10 may compute a weighted average of the positions of each of the subset of points in order to define a single cohesive planar surface that represents the entire subset.

By "collapsing" the subset of feature points into a single cohesive plane, system 10 may improve upon other virtual mapping systems in a number of ways. For example, by averaging a set of points or lines into a single representative cohesive plane, system 10 may reduce (e.g., average-out) a random variation (e.g., noise) in the positions of the individual points or lines that may have been introduced by, for example, a movement of the ICD while capturing the 2D images 102, or noise resulting from a relatively low pixel resolution of the 2D images 102 themselves. Additionally, by constructing a 3D virtual map composed of a relatively small number of cohesive planes, rather than a virtual map based on a relatively large number of individual points, lines or "noisy" planes, system 10 may significantly conserve computation (e.g. processing) power when generating the 3D virtual map and rendering artificial reality content 122 based on the 3D virtual map for display to user 110A. Accordingly, the techniques of this disclosure may provide for both a more-accurate and a more-efficient 3D environment reconstruction.

Figure 2A:
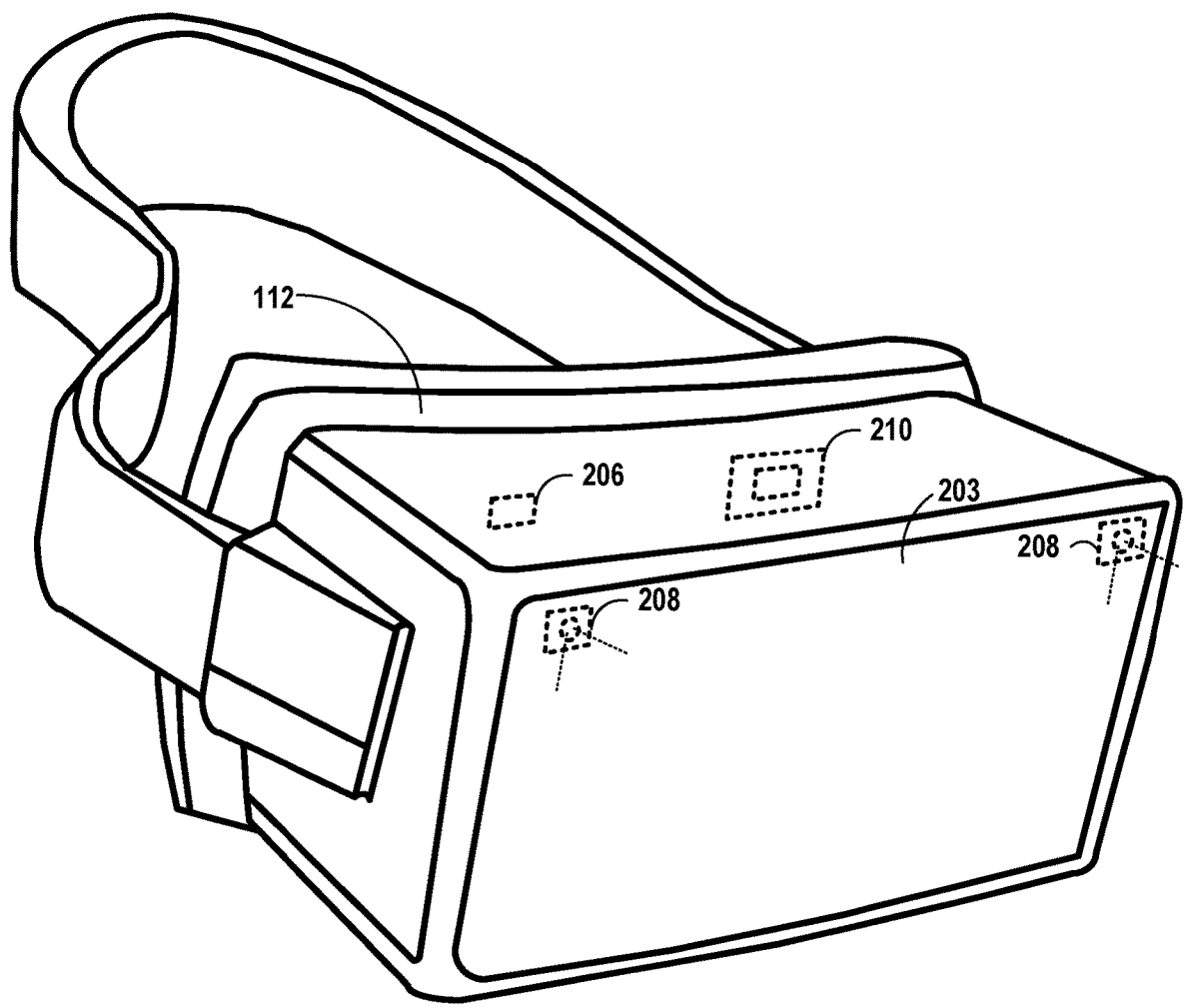
FIG. 2A is an illustration depicting an example HMD, in accordance with techniques of the disclosure.

FIG. 2A is an illustration showing an example implementation of the HMD 112 of FIG. 1. As shown in FIG. 2A, HMD 112 further includes one or more sensors 206, such as one or more accelerometers (also referred to as inertial measurement units or "IMUs") that output data indicative of a motion or acceleration of HMD 112, GPS sensors that output data indicative of a location of HMD 112, radar or sonar sensors that output data indicative of distances of the HMD 112 from various objects, or other sensors that provide indications of a location or orientation of HMD 112 or other objects within a physical 3D environment. Moreover, HMD 112 may include one or more integrated image capture devices (ICDs) 208, such as a video camera, laser scanner, Doppler radar scanner, depth scanner, or the like, configured to capture and output image data representative of a surrounding real-world environment. For example, ICDs 208 may capture a set of 2D images 102 (FIG. 1) depicting a real-world environment.

HMD 112 includes an internal control unit 210, which may include an internal power source and one or more printed-circuit boards having one or more processors, memory, and hardware to provide an operating environment for executing programmable operations to process sensed data and present artificial-reality content on display 203. Internal control unit 210 may be part of a removable computing device, such as a smart phone inserted within HMD 112.

In accordance with the techniques described herein, control unit 210 may include a mapping engine configured to receive a set of 2D images from ICDs 208 and generate a 3D virtual map based at least in part on the 2D images. In some examples, control unit 210 may peer with one or more controllers for HMD 112 (controllers not shown in FIG. 2). Control unit 210 may receive sensor data from the controllers that provides indications of user inputs or controller orientations or locations within the physical 3D environment or relative to HMD 112. In some examples, control unit 210 may send representations of the sensor data to a console 106 (FIG. 1) for processing by the artificial reality application, where the indications may be event data for an artificial reality application. Control unit 210 may execute the artificial reality application to process the sensor data.

More specifically, control unit 210 may be configured to receive a set of 2D images and identify one or more planar surfaces within the images. As described further below, control unit 210 may decompose the 2D images into a plurality of feature points and match corresponding feature points between two or more of the 2D images. Then, based on the relative positions of the matched feature points (e.g., based on respective changes in relative positions of the matched feature points between the images), control unit 210 may construct a 3D "point cloud" from the matched feature points. Control unit 210 may then identify, from within the 3D point cloud, a subset of feature points that defines an approximate planar surface, and "collapse" the approximate planar surface into a cohesive (e.g., "smooth") plane. Control unit 210 may then construct a 3D virtual map of the environment depicted in the 2D images by assembling the identified planes according to one or more constraints, such as the known relative positions of the cameras that captured the images.

Figure 2B:
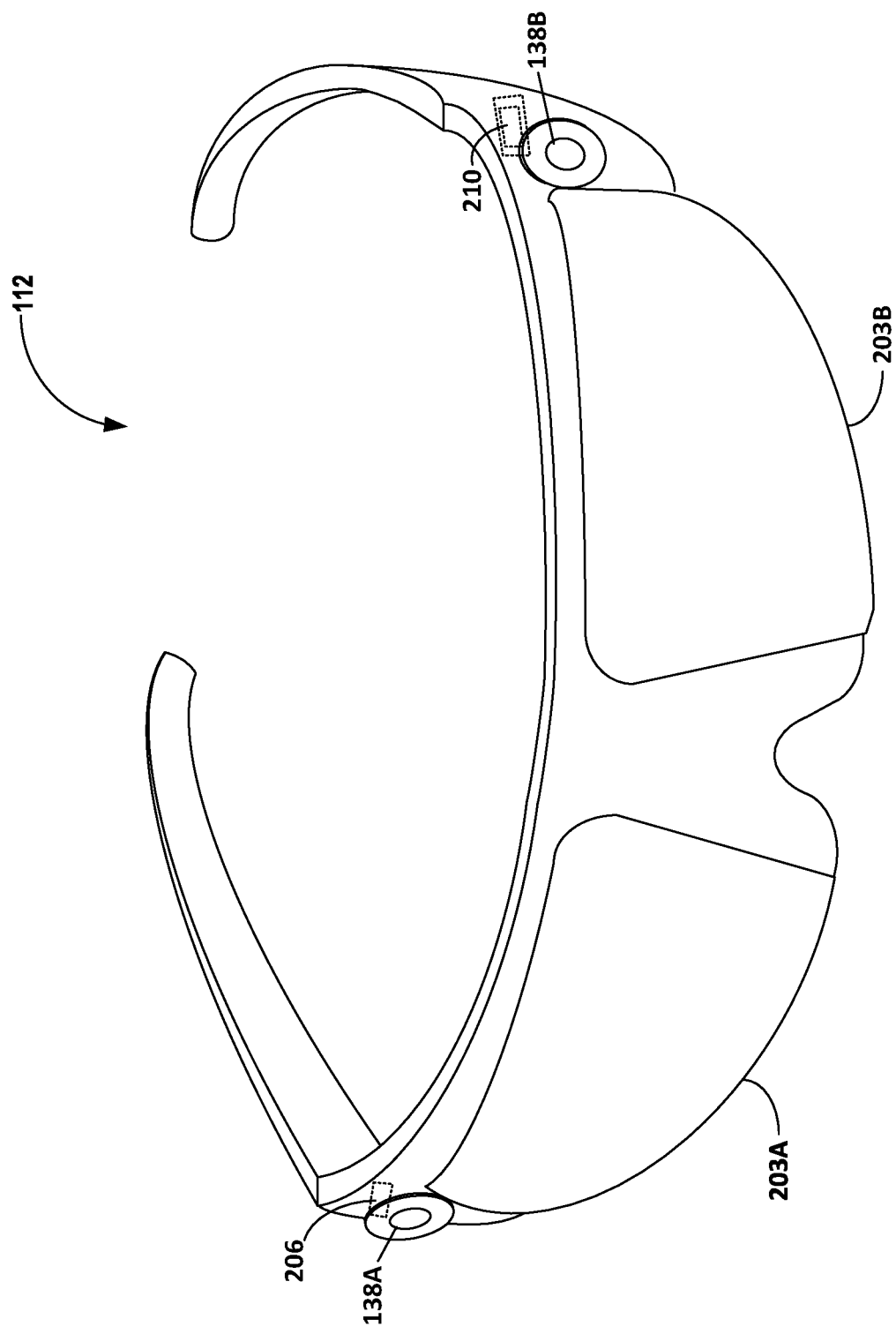
FIG. 2B is an illustration depicting an example HMD, in accordance with techniques of the disclosure.

FIG. 2B is an illustration depicting another example HMD 112, in accordance with techniques of the disclosure. As shown in FIG. 2B, HMD 112 may take the form of glasses. HMD 112 of FIG. 2B may be an example of any of HMDs 112 of FIGS. 1 and 2A. HMD 112 may be part of an artificial reality system, such as artificial reality system 10 of FIG. 1, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

Figure 3:
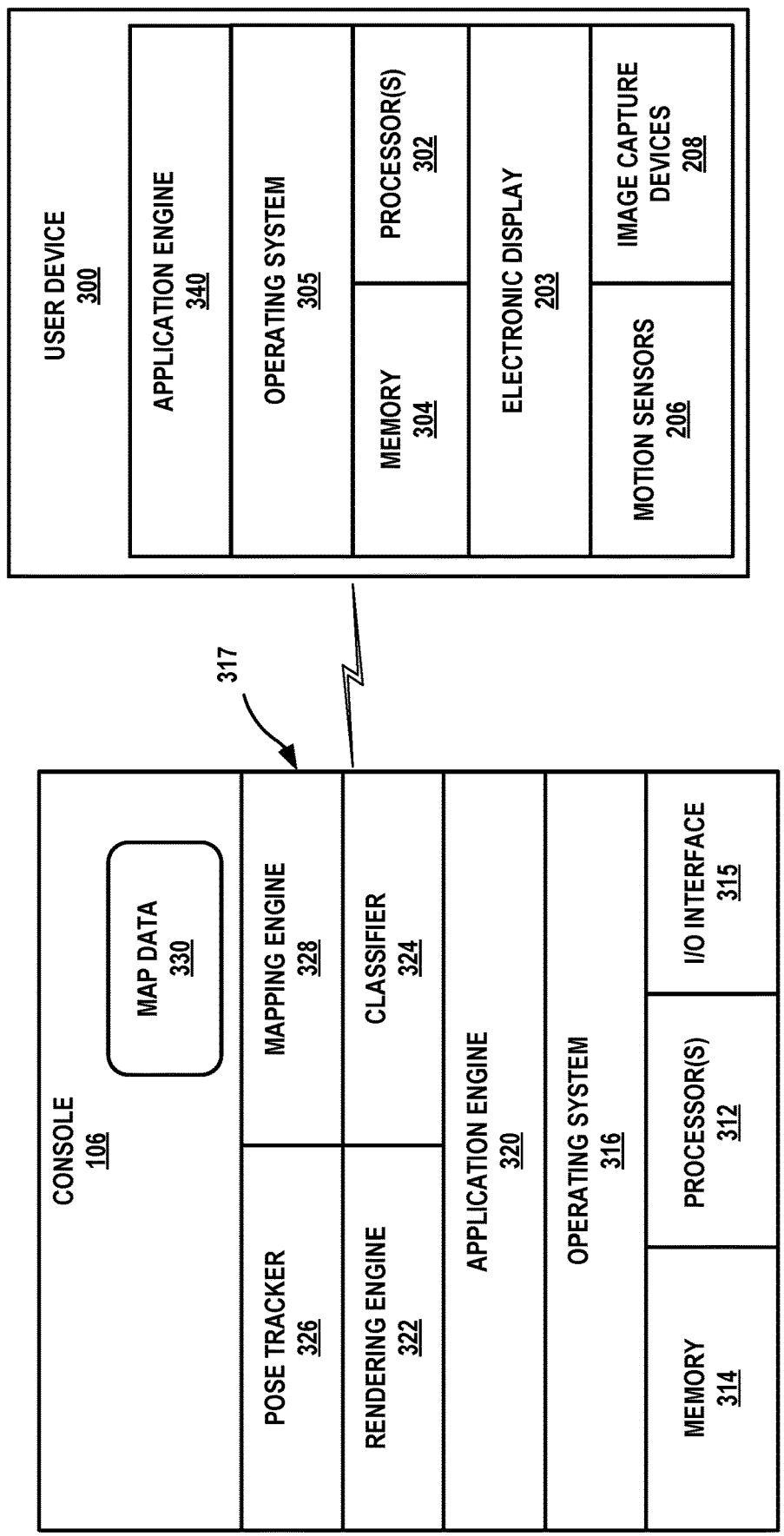
FIG. 3 is a block diagram depicting an example artificial reality system, in accordance with techniques of this disclosure.

FIG. 3 is a block diagram showing example implementations of optional console 106 and a user device 300, such as HMD 112 or user device 118 of FIG. 1. In the example of FIG. 3, user device 300 includes one or more processors 302 and memory 304 that, in some examples, provide a computer platform for executing an operating system 305, which may be an embedded, real-time multitasking operating system. Processors 302 are coupled to electronic display 306.

In this example, user device 300 includes motion sensors 206 and image capture devices 208 coupled to processor 302, but other examples of user devices 300 may include neither or merely either of motion sensors 206 or image capture devices 208. In some examples, processors 302 and memory 304 may be separate, discrete components. In other examples, memory 304 may be on-chip memory collocated with processors 302 within a single integrated circuit. The memory 304, processors 302, operating system 305, and application engine 340 components may collectively represent an example of internal control unit 210 of FIGS. 2A and/or 2B. User device 300 may include user input devices, such as a touchscreen or other presence-sensitive screen example of electronic display 203, microphone, controllers, buttons, keyboard, and so forth.

Operating system 305 provides an operating environment for executing one or more software components, which include application engine 340. Application engine 340 may be an artificial reality application having one or more processes. Application engine 340 may send, to console 106 as mapping information using an I/O interface (not shown in FIG. 3) via a network or other communication link, representations of sensor data generated by motion sensors 206 or images generated by image capture devices 208. The artificial reality application may be, e.g., a teleconference application, a gaming application, a navigation application, an educational application, or training or simulation application.

In general, console 106 is a computing system that interfaces with user devices of an artificial reality system. In some examples, console 106 is a single computing device, such as a workstation, a desktop computer, a laptop. In some examples, at least a portion of console 106, such as processors 312 and/or memory 314, may be distributed across one or more computing devices, a cloud computing system, a data center, or across a network, such as the Internet, another public or private communications network, for instance, broadband, cellular, Wi-Fi, and/or other types of communication networks, for transmitting data between computing systems, servers, and computing devices.

In the example of FIG. 3, console 106 includes one or more processors 312 and memory 314 that provide a computer platform for executing an operating system 316. In turn, operating system 316 provides an operating environment for executing one or more software components 317. Processors 312 are coupled to I/O interface 315, which provides one or more I/O interfaces for communicating with external devices, such as a keyboard, game controllers, display devices, image capture devices, and the like. Moreover, I/O interface 315 may include one or more wired or wireless network interface cards (NICs) for communicating with a network, such as network 104. Each of processors 302, 312 may comprise any one or more of a multi-core processor, a controller, a digital signal processor (DSP), an application-specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read-only memory (ROM), programmable read-only memory (PROM), erasable programmable read-only memory (EPROM), electronically erasable programmable read-only memory (EEPROM), and/or Flash memory.

Software components 317 of console 106 operate to provide an overall artificial reality application. In this example, software components 317 include application engine 320, rendering engine 322, pose tracker 326, and mapping engine 328.

In general, application engine 320 includes functionality to provide and present an artificial reality application, e.g., a teleconference application, a gaming application, a navigation application, an educational application, training or simulation applications, and the like. Application engine 320 and application engine 340 may cooperatively provide and present the artificial reality application in some examples. Application engine 320 may include, for example, one or more software packages, software libraries, hardware drivers, and/or Application Program Interfaces (APIs) for implementing an artificial reality application on console 106. Responsive to control by application engine 320, rendering engine 322 generates artificial reality content for display to the user by application engine 340 of user device 300.

Application engine 320 and rendering engine 322 construct the artificial content for display to user 110 (FIG. 1) in accordance with current pose information for a frame of reference, typically a viewing perspective of HMD 112, as determined by pose tracker 326. Based on the current viewing perspective, rendering engine 322 constructs the artificial reality content which may be overlaid, at least in part, upon the physical 3D environment in which user device 300 is located. During this process, pose tracker 326 may operate on sensed data received from user device 300, such as movement information and user commands, and, in some examples, data from any external sensors 90 or ICD 123 (as shown in FIG. 1 to capture 3D information within the physical 3D environment, such as motion by user device 300, a user thereof, a controller, and/or feature tracking information with respect to the user thereof. Based on the sensed data, pose tracker 326 determines a current pose for the frame of reference of user device 300 and, in accordance with the current pose, generates the artificial reality content for communication to user device 300 for display to the user via electronic display 203.

In some examples, console 106 includes a mapping engine 328 configured to generate maps of a physical 3D environment using mapping information received from user devices. Mapping engine 328 may receive the mapping information in the form of 2D images captured by image capture devices 208 at local poses of user device 300 and/or tracking information for user device 300, for example. Mapping engine 328 processes the images to identify map points for determining topographies of the scenes in the images and use the map points to generate map data 330 that is descriptive of an area of the physical 3D environment in which user device 300 is operating. Map data 330 may include at least one master 3D map of the physical 3D environment that represents a current best map, as determined by mapping engine 328 using the mapping information.

Mapping engine 328 may receive 2D images 102 (FIG. 1) from multiple different user devices operating in different areas of a physical 3D environment and generate different maps for the different areas. The different maps may be disjoint in that the maps do not, in some cases, overlap to describe any of the same areas of the physical 3D environment. However, the different maps may nevertheless be different areas of the master 3D map for the overall physical 3D environment.

As described above, mapping engine 328 may be configured to construct a 3D virtual map based at least in part on a set of two or more images, such as a "triplet" of three 2D images 102. For example, the mapping engine may be configured to receive the triplet of overlapping 2D images 102, identify a set of feature points and/or lines within the images 102, match corresponding points and/or lines between the images, and construct a 3D "point cloud" of matched points. Mapping engine 328 may further be configured to define one or more cohesive planes corresponding to subsets of matched feature points within the 3D point cloud. For example, mapping engine 328 may be configured to perform a "planar sweep" through the 3D point cloud to identify one or more subsets of points that appear to define an approximately planar surface (e.g., points that fall within a threshold distance from a planar surface). Mapping engine 328 may then be configured to "collapse" the subset of points (e.g., the approximate planar surface) into a single cohesive planar surface. For example, mapping engine 328 may compute a weighted average of the positions of each of the subset of points to define a single cohesive planar surface that represents the entire subset of points. Mapping engine 328 may then generate a 3D virtual map of the real-world environment depicted in the 2D images, based on one or more cohesive planar surfaces defined in this manner. In some examples, map data 330 may include the 3D virtual map, which in some examples, may be stored in memory 314.

Console 106 may receive mapping information from user device 300 and progressively generate a map for an area in which user device 300 is operating over time, as user device 300 moves about the area. Pose tracker 326 may localize user device 300, using any of the aforementioned methods, to the map for the area. Pose tracker 326 may also attempt to localize user device 300 to other maps generated using mapping information from other user devices. At some point, pose tracker 326 may compute the local pose for user device 300 to be in an area of the physical 3D environment that is described by a map generated using mapping information received from a different user device. In some examples, by using mapping information received from user device 300 located and oriented at the computed local pose, mapping engine 328 may join the map for the area generated using mapping information for user device 300 to the map for the area generated using mapping information for one or more different user devices and generate a combined map for the 3D virtual map. Mapping engine 328 stores the maps as map data 330.

In some examples, some or all of the functionality attributed to mapping engine 328, pose tracker 326, rendering engine 322, and application engine 320 may be performed by user device 300.

Figure 4:
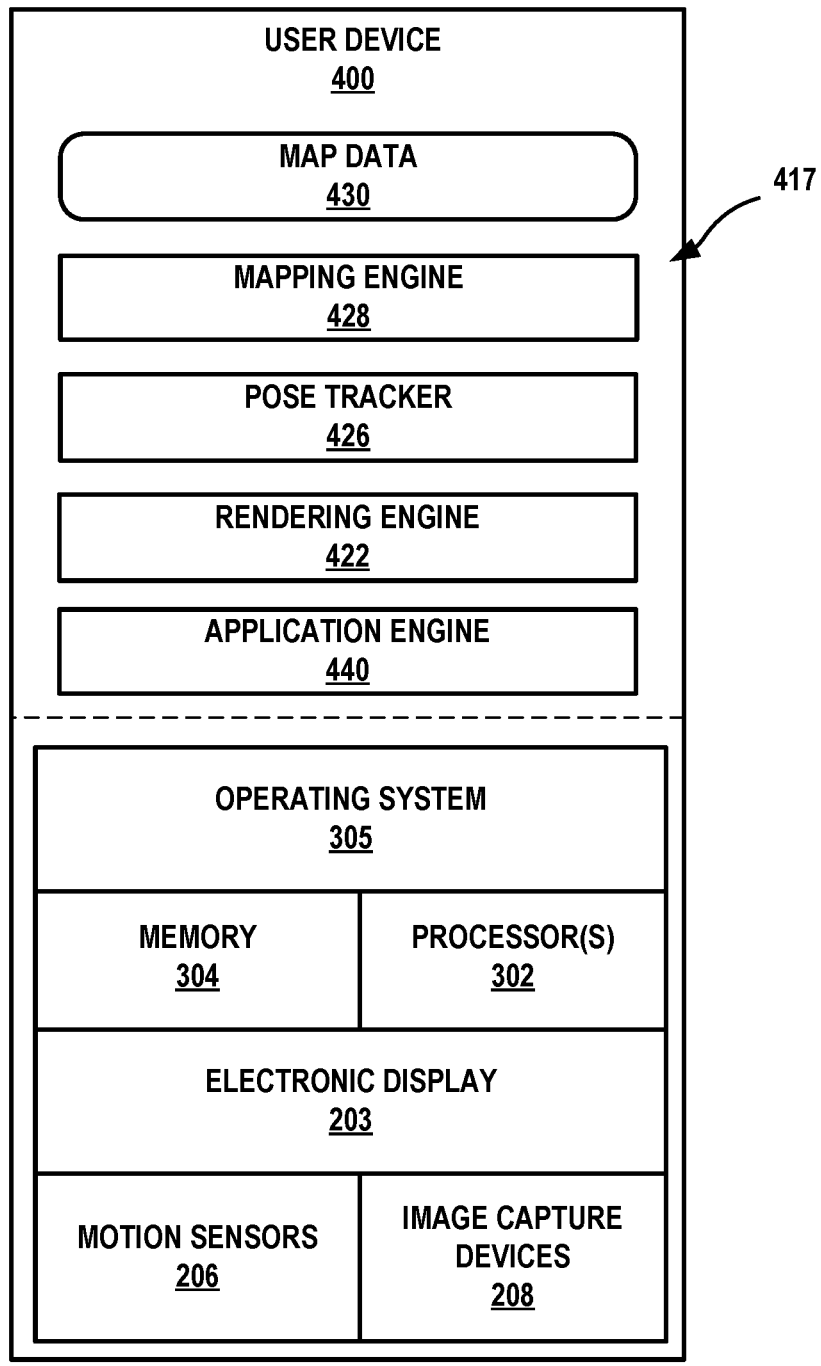
FIG. 4 is a block diagram depicting an example of a user device for an artificial reality system, in accordance with techniques of this disclosure.

FIG. 4 is a block diagram depicting an example user device 400 for an artificial reality system, in accordance with techniques of this disclosure. User device 400 operates as a stand-alone device, i.e., is not tethered to a console, and may represent an instance of any of the aforementioned user devices. User device 400 may represent an HMD or tablet computer, for instance. In this example, similar to FIG. 3, user device 400 includes one or more processors 302 and memory 304 that, in some examples, provide a computer platform for executing an operating system 305, which may be an embedded, real-time multitasking operating system. In turn, operating system 305 provides an operating environment for executing one or more software components 417. Moreover, processor(s) 302 are coupled to electronic display 203, motion sensors 206, and image capture devices 208.

In the example of FIG. 4, software components 417 operate to provide an overall artificial reality application. In this example, software components 417 include application engine 440, rendering engine 422, pose tracker 426, and mapping engine 428. In various examples, software components 417 operate similar to the counterpart components of console 106 of FIG. 3 (e.g., application engine 320, rendering engine 322, pose tracker 326, and mapping engine 328).

User device 400 may generate map data 430. User device 400 may send the map data 430 to other user devices and receive map data from other user devices to cooperatively generate a 3D virtual map for the physical 3D environment. User device 400 may generate artificial reality content for display by electronic display 203. As described further below with respect to FIGS. 5 and 6, respectively, mapping engine 428 may include either or both of a Simultaneous Localization and Mapping (SLAM) system or a Structure from Motion (SfM) system. A SLAM system may be configured to construct and update a map of an environment in real-time while identifying a corresponding location of user device 400 within the map. Alternatively, a SfM system may be configured to construct a 3D map based on a set of 2D images at some point in time after the images are captured (e.g., offline, or not in real-time).

FIG. 5 is a is a block diagram illustrating a more detailed example implementation of a distributed architecture for a multi-device artificial reality system in which one or more devices are implemented using one or more System on a Chip (SoC) integrated circuits within each device, in accordance with techniques of this disclosure. In some examples, artificial reality system 600 includes a peripheral device 502 operating in conjunction with HMD 112. In this example, peripheral device 502 is a physical, real-world device. Peripheral device 502 may include one or more presence-sensitive surfaces for detecting user inputs by detecting a presence of one or more objects (e.g., fingers, stylus) touching or hovering over locations of the presence-sensitive surface. In some examples, peripheral device 502 may include an output display, which may be a presence-sensitive display. In some examples, peripheral device 502 may be a smartphone, tablet computer, personal data assistant (PDA), or other hand-held device. In some examples, peripheral device 502 may be a smartwatch, smart ring, or other wearable device. Peripheral device 502 may also be part of a kiosk or other stationary or mobile system. Peripheral device 502 may or may not include a display device for outputting content to a screen.

As described, HMD 112 is architected and configured to enable concurrent execution of multiple artificial reality applications and collaborative scene rendering in accordance with techniques described in this disclosure. In general, the SoCs illustrated in FIG. 5 represent a collection of specialized integrated circuits arranged in a distributed architecture, where each SoC integrated circuit includes various specialized functional blocks configured to provide an operating environment for artificial reality applications. FIG. 5 is merely one example arrangement of SoC integrated circuits. The distributed architecture for a multi-device artificial reality system may include any collection and/or arrangement of SoC integrated circuits.

In this example, SoC 630A of HMD 112 comprises functional blocks including tracking 670, an encryption/decryption 680, co-processors 682, security processor 683, and an interface 684. In some examples SoC 630A includes a mutex 695 that performs process authentication when coordinating the sharing of resources within SoC 630A, or across AR system 600. For instance, in one example approach, one or more coprocessors 682 generates a common scene of an artificial reality environment that is collaboratively constructed and simultaneously controlled by the multiple artificial reality applications concurrently executing on one or more coprocessors 682. In one example, aspects of the common scene are handled as a shared resource, with hardware mutex 695 controlling access by the artificial reality applications to the shared resource via a locking mechanism protected by software process authentication. In one example approach, the hardware mutex 695 uses process authentication to ensure that other processes do not, deliberately or by mistake, release a lock on the hardware mutex.

In another example approach, a centralized scene controller executing on one of the coprocessors 682 aggregates the modeling information from each of the artificial reality applications, positions the respective objects within a common 3D scene, and renders the 3D visualization of the objects to the user such that the artificial reality applications are concurrently running and displayed on the common scene. In one such example approach, the centralized scene controller accesses hardware mutexes 695 used by each of the artificial reality applications to ensure that the data to be displayed reflects the latest information received from each of the artificial reality applications. The hardware mutexes 695 authenticate each process accessing the mutex to ensure that other processes do not, deliberately or by mistake, release a lock on one or more of the hardware mutexes.

Tracking 670 provides a functional block for eye tracking 672 ("eye 672"), hand tracking 674 ("hand 674"), depth tracking 676 ("depth 676"), and/or Simultaneous Localization and Mapping (SLAM) 678 ("SLAM 678"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 688A-688N (collectively, "image capture devices 688"). Image capture devices may include video cameras, laser scanners, Doppler radar scanners, depth scanners, or the like, configured to output image data representative of the physical environment. More specifically, image capture devices capture image data representative of objects (including peripheral device 502 and/or hand) in the physical environment that are within a field of view of image capture devices, which typically corresponds with the viewing perspective of HMD 112. Based on the sensed data and/or image data, tracking 670 determines, for example, a current pose for the frame of reference of HMD 112 and, in accordance with the current pose, renders the artificial reality content.

Encryption/decryption 680 is a functional block to encrypt outgoing data communicated to peripheral device 502 or security server and decrypt incoming data communicated from peripheral device 502 or security server. Encryption/decryption 680 may support symmetric key cryptography to encrypt/decrypt data with a session key (e.g., secret symmetric key).

Co-application processors 682 include various processors such as a microprocessor, video processing unit, graphics processing unit, digital signal processors, encoders and/or decoders, and/or others. In accordance with the techniques described in this disclosure, all or portions of a backend shell may be in hardware, software, or a combination of hardware and software. For example, the backend shell of a concurrent application engine may be executed on co-application processors 682. A plurality of artificial reality applications may be concurrently executed on co-application processors 682.

Security processor 683 provides secure device attestation and mutual authentication of HMD 112 when pairing with devices, e.g., peripheral device 502, used in conjunction within the AR environment. Security processor 683 may authenticate SoCs 630A-630C of HMD 112.

In some example approaches, interface 684 is a functional block that includes one or more interfaces for connecting to functional blocks of SoC 630A. In one example, one or more of SoCs 630A-630C are connected through interface 684 to memory 634. In some examples, SoC 630A may connect with SoC 630B, 630C using interface 684. In addition, SoC 630A may connect with a communication device (e.g., radio transmitter) using interface 684 for communicating with other devices, e.g., peripheral device 502. As one example, interface 684 may include peripheral component interconnect express (PCIe) slots.

SoCs 630B and 630C each represents display controllers for outputting artificial reality content on respective displays, e.g., displays 686A, 686B (collectively, "displays 686"). In this example, SoC 630B may include a display controller 696A for display 668A to output artificial reality content for a left eye 687A of a user. In the example shown, SoC 630B includes a decryption block 692A, decoder block 694A, display controller 696A, and/or a pixel driver 698A for outputting artificial reality content on display 686A. Similarly, SoC 630C may include a display controller 696B for display 686B to output artificial reality content for a right eye 687B of the user. In the example shown, SoC 630C includes decryption 692B, decoder 694B, display controller 696B, and/or a pixel driver 698B for generating and outputting artificial reality content on display 686B. Displays 668 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content. In some examples SoCs 630B and 630C of HDM 112 also include mutexes 697A and 697B, respectively. Mutexes 697A and 697B are used to coordinate the sharing of resources within each SoC, or across AR system 600.

Peripheral device 502 includes SoCs 610A and 610B configured to support an artificial reality application. In this example, SoC 610A comprises functional blocks including tracking 640, an encryption/decryption 650, a display processor 652, an interface 654, and security processor 656. Tracking 640 is a functional block providing eye tracking 642 ("eye 642"), hand tracking 644 ("hand 644"), depth tracking 646 ("depth 646"), and/or Simultaneous Localization and Mapping (SLAM) 648 ("SLAM 648"). For example, peripheral device 502 may receive input from one or more accelerometers (also referred to as inertial measurement units or "IMUs") that output data indicative of current acceleration of peripheral device 502, GPS sensors that output data indicative of a location of peripheral device 502, radar or sonar that output data indicative of distances of peripheral device 502 from various objects, or other sensors that provide indications of a location or orientation of peripheral device 502 or other objects within a physical environment. Peripheral device 502 may in some examples also receive image data from one or more image capture devices, such as video cameras, laser scanners, Doppler radar scanners, depth scanners, or the like, configured to output image data representative of the physical environment. Based on the sensed data and/or image data, tracking block 640 determines, for example, a current pose for the frame of reference of peripheral device 502 and, in accordance with the current pose, renders the artificial reality content to HMD 112.

Encryption/decryption 650 encrypts outgoing data communicated to HMD 112 or security server and decrypts incoming data communicated from HMD 112 or security server. Encryption/decryption 550 may support symmetric key cryptography to encrypt/decrypt data using a session key (e.g., secret symmetric key). Display processor 652 includes one or more processors such as a video processing unit, graphics processing unit, encoders and/or decoders, and/or others, for rendering artificial reality content to HMD 112. Interface 654 includes one or more interfaces for connecting to functional blocks of SoC 510A. In one example, one or more of SoCs 610A-610C are connected through interface 654 to memory 614. SoC 610A may connect with one or more communication devices (e.g., radio transmitter) using interface 654 for communicating with other devices, e.g., HMD 112. As one example, interface 654 may include peripheral component interconnect express (PCIe) slots. Security processor 656 provides mutual authentication of peripheral device 502 when pairing with devices, e.g., HMD 112, used in conjunction within the AR environment. Security processor 656 may also authenticate SoCs 610A, 610B of peripheral device 502.

SoC 610B includes co-application processors 660 and application processors 662. In this example, co-application processors 660 includes various processors, such as a vision processing unit (VPU), a graphics processing unit (GPU), and/or central processing unit (CPU). Application processors 662 may include a processing unit for executing one or more artificial reality applications to generate and render, for example, a virtual user interface to a surface of peripheral device 502 and/or to detect gestures performed by a user with respect to peripheral device 502. In some examples SoCs 610A and 610B of peripheral device 502 also include mutexes 657 and 667, respectively, within each respective integrated circuit. Mutexes 657 and 667 may be used to coordinate the sharing of resources within each SoC, or across AR system 600 by ensuring that only authenticated software processes can release a lock on mutexes 657 and 667.

Figure 6:
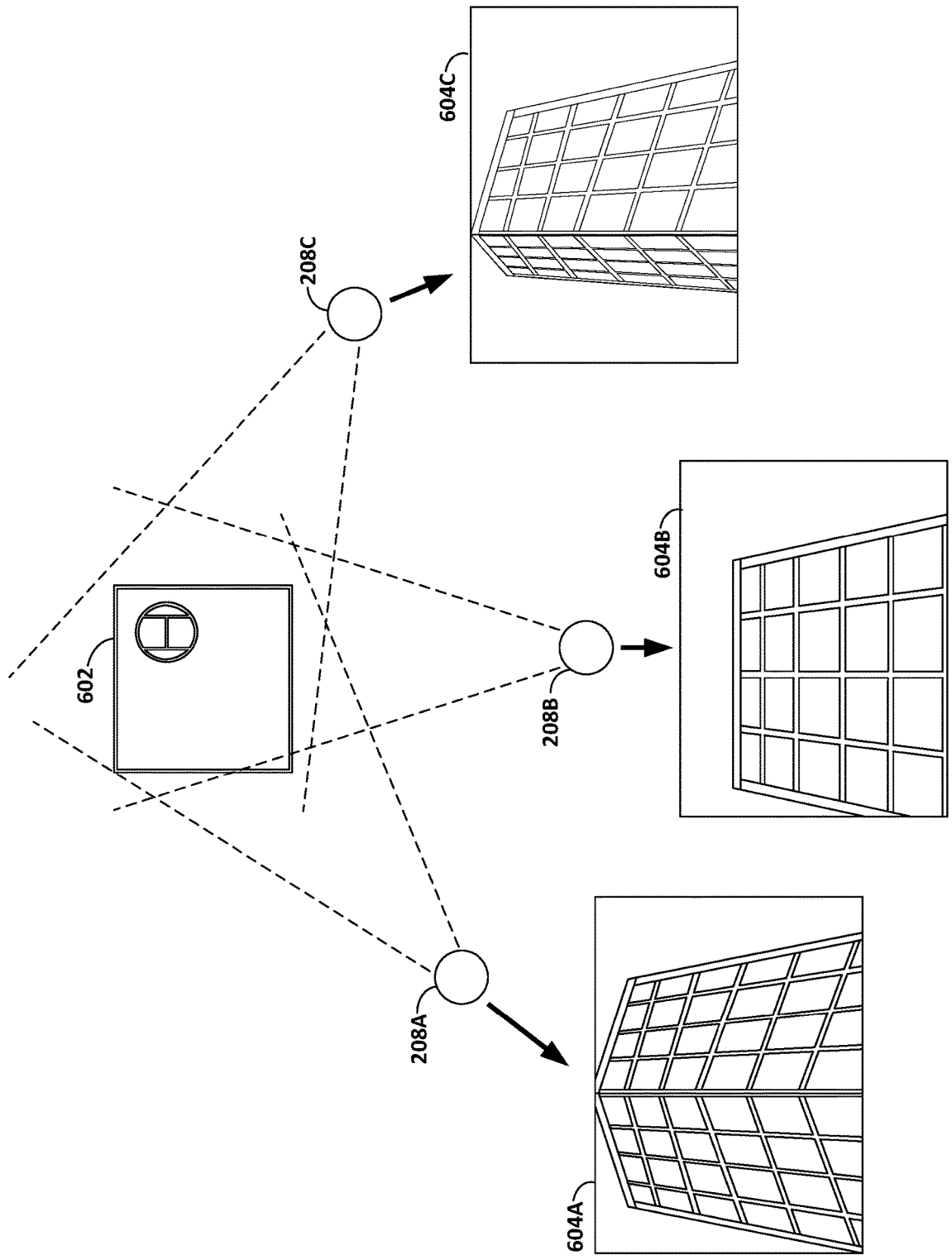
FIG. 6 is a conceptual diagram depicting image-capture devices capturing images of a real-world environment from multiple angles, according to techniques of this disclosure.

FIG. 6 is a conceptual diagram depicting image capture devices 208 capturing images of a real-world environment from multiple angles, according to techniques of this disclosure. As shown in FIG. 6, image capture devices 208A-208C (collectively, "image capture devices 208") may include a single image capture device 208 at different locations at different times, or alternatively, multiple image capture devices 208 disposed in different physical locations. Image capture devices (ICDs) 208 may be examples of ICD 123 of user device 118 (FIG. 1), ICDs 208 of HMD 112 (FIG. 2A), ICDs 138 of HMD 112 (FIG. 2B), ICD 208 of user device 300 (FIG. 3) or user device 400 (FIG. 4), or a standalone ICD, such as a camera or video camera, e.g., a device whose primary function is to capture image data.

ICDs 208 are configured to capture (e.g., photograph or record) a set of 2D images 604A-604C (collectively, "images 604") of a real world environment. A set of three overlapping images (e.g., images at least partially depicting a common subject from three different angles and/or distances) may be referred to as a "triplet." In some examples, set of two or more overlapping 2D images may provide enough relative information (e.g., the relative distance between two or more resolvable objects in the images) so as to enable depth perception among the images. For example, an image region overlapped by two or more images may enable a determination of the relative distances between any two points in the images, or by extension, the relative distances between each image capture device 208 and the subject depicted. For example, due to the concept of "parallax," objects within images 604 that maintain a more constant relative position (smaller parallax) between two overlapping images 604 may be determined to be more distant from the respective ICDs 208. Conversely, an object that appears to significantly change its position between two overlapping images 604 (larger parallax) may be determined to be relatively closer to the respective ICDs 208. Systems that perform these types of photogrammetric range-imaging techniques are commonly referred to as "Structure from Motion" (SfM) systems.

In the example depicted in FIG. 6, three ICDs 208 (or alternatively, a single ICD 208 in three locations) each capture a respective 2D image 604 of a building 602, such as a skyscraper (depicted from an overhead view at the top of FIG. 5). Image 604A equally depicts a first face (e.g., wall) and a second face of the building. Image 604B depicts only the second face of the building. Image 604C partially depicts the second face of the building, but primarily depicts a third face of the building. The three images 604 overlap in depicting the second face of the building from three different angles and/or depths. It is to be understood that, although the examples of FIGS. 6-9 are described with respect to only a single building 602 for purposes of clarity, 2D images 604 may include any number of buildings, surfaces, or other objects.

Figure 7:
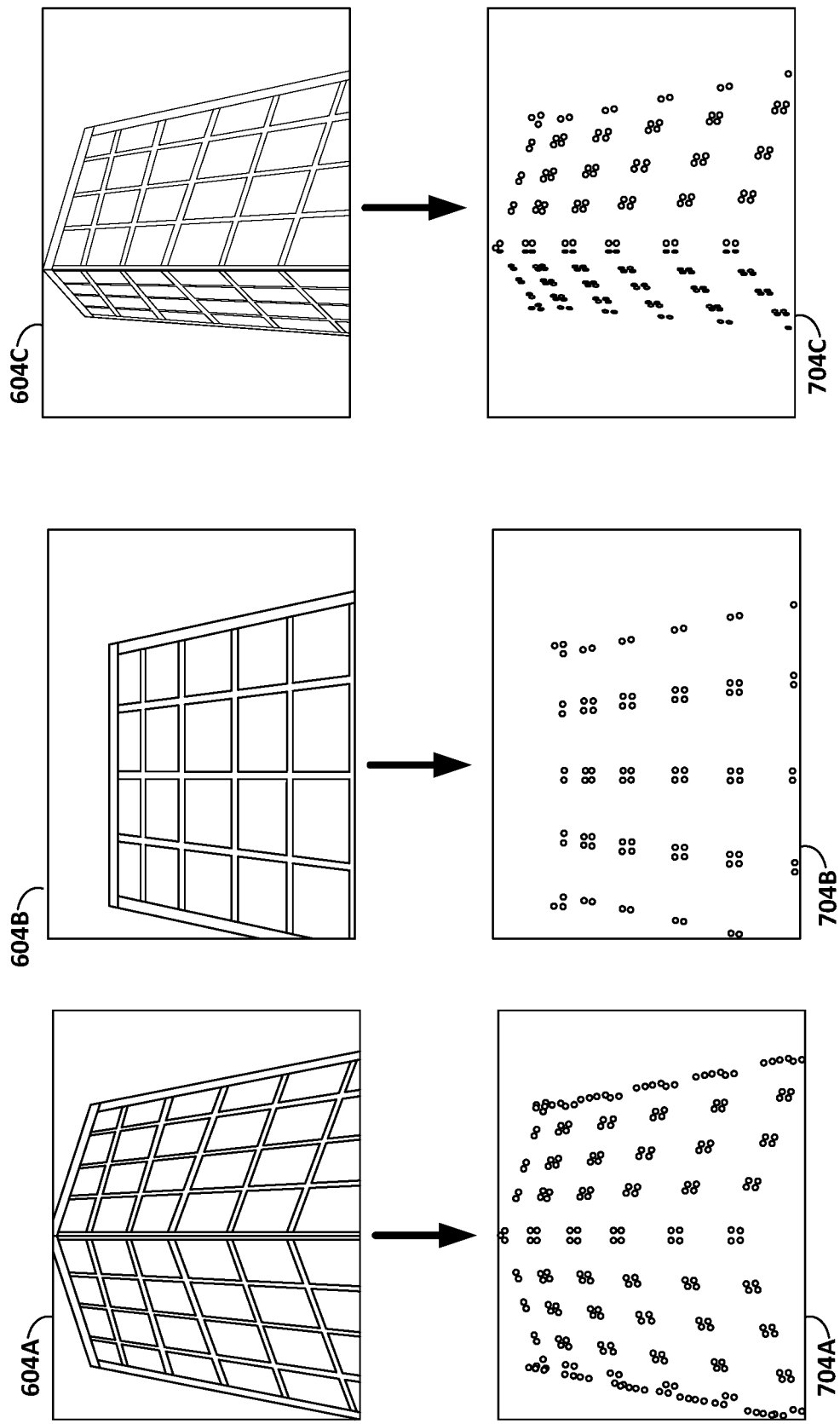
FIG. 7 is a conceptual diagram depicting a method of identifying a set of points within a triplet of images of a real-world environment, according to techniques of this disclosure.

As shown in FIGS. 7-10, in accordance with techniques of this disclosure, a mapping engine 328 (e.g., within internal control unit 210 of HMD 112 of FIG. 2A, or within console 106 of FIG. 3) is configured to receive the triplet of images 604 and generate a 3D virtual map based on the real-world environment depicted in the images. For example, as shown in FIG. 7, mapping engine 328 is configured to receive the triplet of images 604 from ICD 208 and identify a set of feature points and/or edges within each respective image 604. For example, mapping engine 328 may include one or more feature-point and/or edge-extraction algorithms, or other image-recognition software, configured to decompose a graphical 2D image into a plurality of points and/or lines (e.g., edges). For example, an edge may include any line defining a boundary between two distinct sets of pixels within an image, such as pixels of different colors. In some cases, a feature point may include an intersection between two or more edges. Feature points may also indicate an external surface of an object or an edge of an object.

In the example shown in FIG. 7, mapping engine 328 decomposes each 2D image 604A-604C into a respective set of feature points 704A-704C (collectively, "feature points 704"). For example, a majority of the feature points 704 may include the intersection points from the corners of the windows on the exterior faces of the building 602 (FIG. 5). Other feature points may indicate the edges of the building 602 itself.

Figure 8:
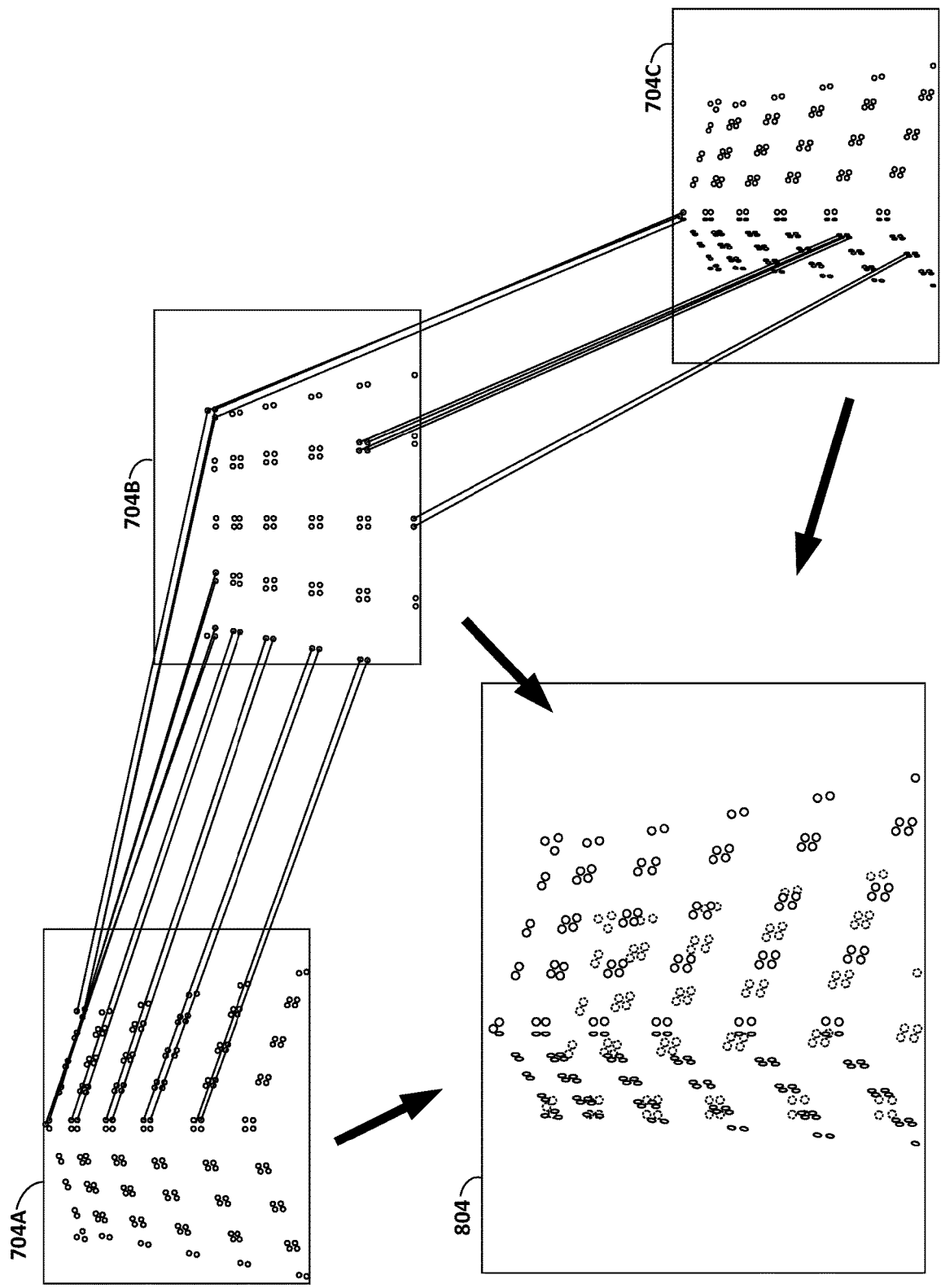
FIG. 8 is a conceptual diagram depicting a method of matching corresponding points to generate a 3D point cloud, according to techniques of this disclosure.

As shown in FIG. 8, mapping engine 328 may then match corresponding feature points or edges 704 from two or more of the 2D images 604. For example, mapping engine 328 may include one or more algorithms configured to identify one or more common feature points among two or more images. For example, a feature point matching algorithm may designate a localized region or area around each feature point, generate a "feature descriptor" defining each region, and then compare the feature descriptors between two or more images to identify feature points with feature descriptors having above-threshold similarities. For two or more 2D images that are substantially similar to each other (e.g., captured from approximately the same location and orientation), the feature point matching algorithm may search in similar locations within each respective image for corresponding feature points.

In some examples, each 2D image 604 (e.g., image data) may additionally include metadata describing for example, the date and time and/or the relative location, position, and/or orientation of the ICD 208 when ICD 208 captured the image. For example, in cases in which ICD 208 is incorporated within a device such as HMD 112 (FIG. 2A) that also incorporates one or more motion sensors 206, geolocation sensors (e.g., GPS), or orientation sensors (e.g., compasses or magnetometers), the device may "tag" each captured image 208 with the respective sensor metadata. In these examples, mapping engine 328 may further use the tagged sensor data to match feature points between two or more images. For example, mapping engine 328 may compare the position, location, and/or orientation data between two images in order to determine a relative pairwise geometry between the two ICDs 208 at the time the images were captured. For example, mapping engine 328 may determine, based on the sensor data, both a change in position (e.g., a translation) and/or a change in orientation (e.g., angle of field-of-view) between the two ICDs 208, and based on the difference in position and/or orientation, determine an expected overlapping region between the two or more images, and from within the expected overlapping region, identify common feature points and/or edges.

In some examples, such as when images 604 do not include ICD metadata, mapping engine 328 may perform the reverse process to that previously described. In other words, mapping engine 328 may first identify matching feature points and/or edges using conventional methods, and then, based on the relative parallax between each set of matched points (e.g., the change in position of one matched point relative to the change in position of another matched point), mapping engine 328 may determine the relative position and orientation of the ICDs 208 when the ICDs 208 captured the respective images 604. In either scenario, mapping engine 328 may store the relative positions and orientations of ICDs 208 as pairwise geometries within memory 304 (FIGS. 3 and 4).

As further shown in FIG. 8, based on the matched feature points 704 and the pairwise geometries of the ICDs 208, mapping engine 328 may assign a set of three-dimensional spatial coordinates to each feature point and/or edge and construct a 3D "point cloud" 804. As previously described, mapping engine 328 may determine that matched feature points having a relatively small parallax (e.g., a smaller change in position between two images, relative to other points) are located at a greater depth away from ICDs 208, and matched feature points having a relatively large parallax (e.g., a larger change in position between two images, relative to other points) are located relatively closer to ICDs 208. From this determined depth data, as well as the relative length and width data directly apparent from the 2D images, mapping engine 328 may determine and assign a set of 3D geometric coordinates, defined relative to the known ICD positions and orientations, to each set of matched feature points. The collective set of all 3D geometric coordinates may be visualized as 3D point cloud 804. 3D point cloud 804 may describe a table of 3D spatial coordinates for the identified feature points, a graphical representation of the feature points in 3D space (as shown in FIG. 8), or both.

Figure 9A:
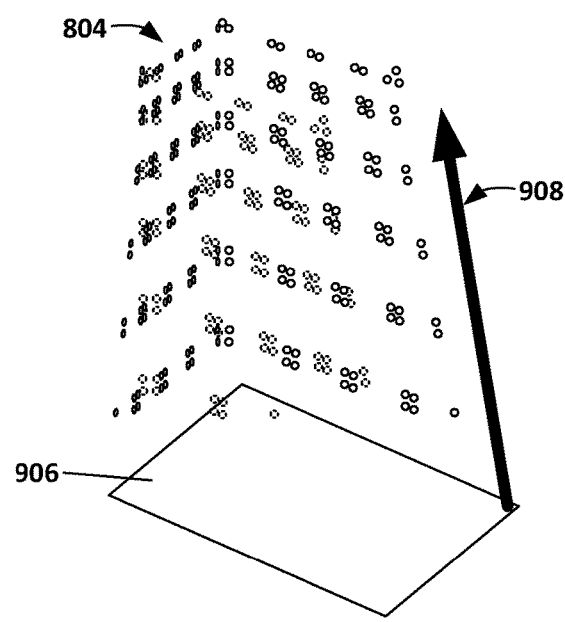
FIG. 9A is a conceptual diagram depicting a method of performing a planar sweep along through a 3D point cloud, according to techniques of this disclosure.

As shown in FIG. 9A, mapping engine 328 may then use a technique known as a "planar sweep" to scan through the 3D point cloud 804 in order to identify one or more subsets of feature points that collectively define an approximately planar surface.

For example, mapping engine 328 may perform a planar sweep by first defining a first imaginary plane 906. Imaginary plane 906 may include a theoretical planar surface of infinite length and width, and zero depth, however, for purposes of some calculations, the length and width of imaginary plane 906 may be constrained to extend across a total length and width of 3D point cloud 804. Imaginary plane 906 may include both an initial position and a relative orientation. For examples, as shown in FIG. 9A, imaginary plane 906 includes a relatively horizontal orientation, and its initial position is disposed approximately at the "bottom" of 3D point cloud 804. While in some cases, the orientation and initial position of imaginary plane 906 may be selected or assigned arbitrarily, strategic selection of at least the orientation may improve the performance of mapping the real-world environment, according to techniques of this disclosure. For example, the horizontal orientation of imaginary plane 906 in FIG. 9A may be strategically selected because the real-world environment represented by 3D point cloud 804 includes a "Manhattan"-type environment composed of numerous surfaces oriented parallel to horizontal and vertical axes. Accordingly, performing a planar sweep with an imaginary plane 906 oriented along one of these axes may be more likely to identify those surfaces within 3D point cloud 804.

In some examples, mapping engine 328 may perform a "vanishing point" analysis on 2D images 604 in order to identify two or more parallel lines along which to orient imaginary plane 906. In some examples, the two or more parallel lines may appear to converge at their common vanishing point, which mapping engine 328 may then use to identify a horizon line within the images, and accordingly, a relative "horizontal" orientation along which to align imaginary plane 906.

In some examples in which 2D images 604 are "tagged" with additional sensor data, as described above, mapping engine 328 may select a horizontal orientation for imaginary plane 906 by aligning imaginary plane 906 orthogonal to a gravity vector, as indicated by inertial measurement unit (IMU) data included with images 604. Mapping engine 328 has defined and oriented imaginary plane 906 with respect to 3D point cloud 804, mapping engine 328 may perform a planar sweep by "dragging" imaginary plane 906 through 3D point cloud 804 along an axis 908 that is orthogonal to imaginary plane 906.

Figure 9B:
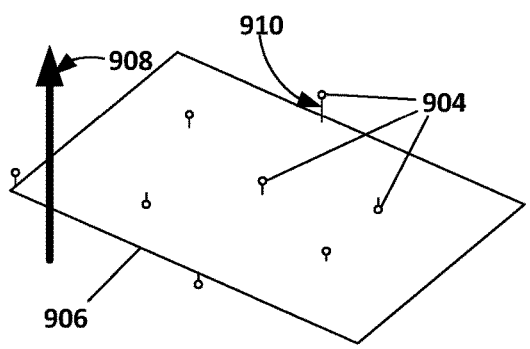
FIG. 9B is a perspective view depicting a method of identifying a subset of feature points making up an approximate planar surface within a 3D point cloud, according to techniques of this disclosure.
Figure 9C:
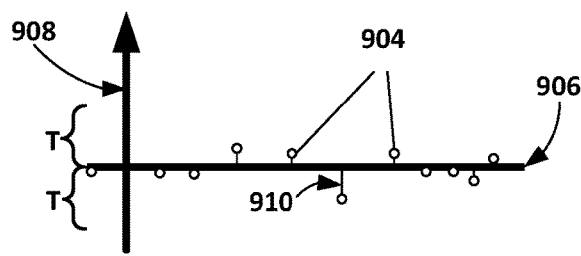
FIG. 9C is a side view of the subset of feature points of FIG. 9B.

FIG. 9B is a perspective view, and FIG. 9C is a side view, of imaginary plane 906 "frozen" at a particular point along orthogonal axis 908 during the planar sweep through 3D point cloud 804. As shown in FIGS. 9B and 9C, at any given point during the planar sweep, mapping engine 328 may identify a subset of feature points 904 within 3D point cloud 804 that are each located within a maximum threshold distance "T" from imaginary plane 906, wherein the distance is measured along a respective line 910 that connects each respective point 904 to imaginary plane 906, and wherein the respective line 910 is orthogonal to plane 906 (e.g., wherein each line 910 is parallel to axis 908).

Figure 9D:
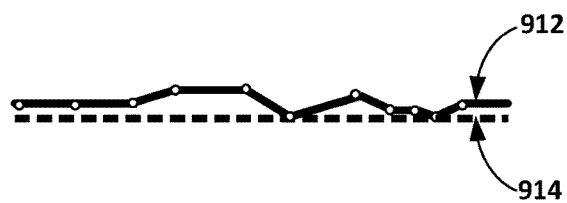
FIG. 9D is a side view of a method of collapsing an approximate planar surface into a cohesive planar surface, according to techniques of this disclosure.

As shown in FIG. 9D, by connecting adjacent or consecutive point 904, the subset of feature points 904 may collectively define a common "bumpy," "noisy," or "approximate" planar surface 912 (depicted from a side view in FIG. 9D), such that the "bumps" (e.g., deviations from a "smooth" planar surface) do not exceed a threshold value (again defined by the threshold distance "T").

In some examples, mapping engine 328 may be constrained to require a minimum threshold number of feature points 904 (e.g., at least four feature points 904) in order to "identify" an approximate planar surface 912 within 3D point cloud 804. For example, since any arbitrary set of three points in space defines a common plane between them, mapping engine 328 may require at least four feature points to be approximately aligned along a common plane in order to identify or define an approximate planar surface 912 within 3D point cloud 804. In some examples, mapping engine 328 may assign a "confidence" value to each identified approximate plane 906, wherein the confidence value is correlated to the number of feature points making up the approximate plane 912 and/or the extent of the points' respective deviations from a "smooth" plane (e.g., the respective distances 910).

In some examples in accordance with this disclosure, system 10 may presume that each subset of feature points 904 making up a common "approximate" plane 912 would, in reality, be aligned along a cohesive (e.g., smooth or ideal) planar surface, but are misaligned within the 3D point cloud 804 due to random "noise" (e.g., variation) introduced by one or more sources. Random variation in the relative positions of individual feature points 704 may be introduced by, for example, movement of ICD 208 while capturing the respective 2D image 604, or from a relatively low resolution of the respective 2D images 604 from which mapping engine 328 extracted the feature points 704. Accordingly, for each set of feature points 904 aligned along an approximate ("bumpy") planar surface 912, mapping engine 328 may "identify" (e.g., define) a single cohesive planar surface 914 representing the subset of feature points 904. For example, mapping engine 328 may compute an average of the distances between each threshold point 904 and any arbitrary plane that is parallel to the common "approximate" plane 912 between them. This calculation averages out the variation between the points, resulting in a new "cohesive" plane 914 (depicted from a side view in FIG. 9D). In doing so, mapping engine 328 may be described to have "collapsed" the set of feature points 904 into a cohesive planar surface 914 representing the feature points 904, thereby increasing the accuracy of their position data (e.g., by averaging out the random noise), and also increasing the computational efficiency of mapping them (e.g., by storing a representation of a single cohesive plane 914 rather than a plurality of unevenly distributed feature points 904).

In another example, mapping engine 328 may "collapse" the set of feature points 904 into a cohesive plane 914 by performing a least-squares-fit analysis in order to determine the plane of "best fit" through the set of feature points. In other words, mapping engine 328 may determine the cohesive plane 914 that reduces or minimizes a chi-squared value or a standard-deviation distance between each of the feature points 904 and the plane 914. Cohesive plane 914 may or may not conform (e.g., reflect or match with respect to position and orientation) to imaginary plane 906 at the point at which mapping engine 328 identified the subset of feature points 904 in the first instance. Mapping engine 328 may "anchor" the known positions of the ICDs 208 to each cohesive plane 914 in order to construct a 3D virtual map of the real-world environment captured in the 2D images. In other words, mapping engine 328 may use the known ICD positions to constrain (e.g., align with respect to each other) the defined cohesive planes within the 3D virtual map.

Figure 10:
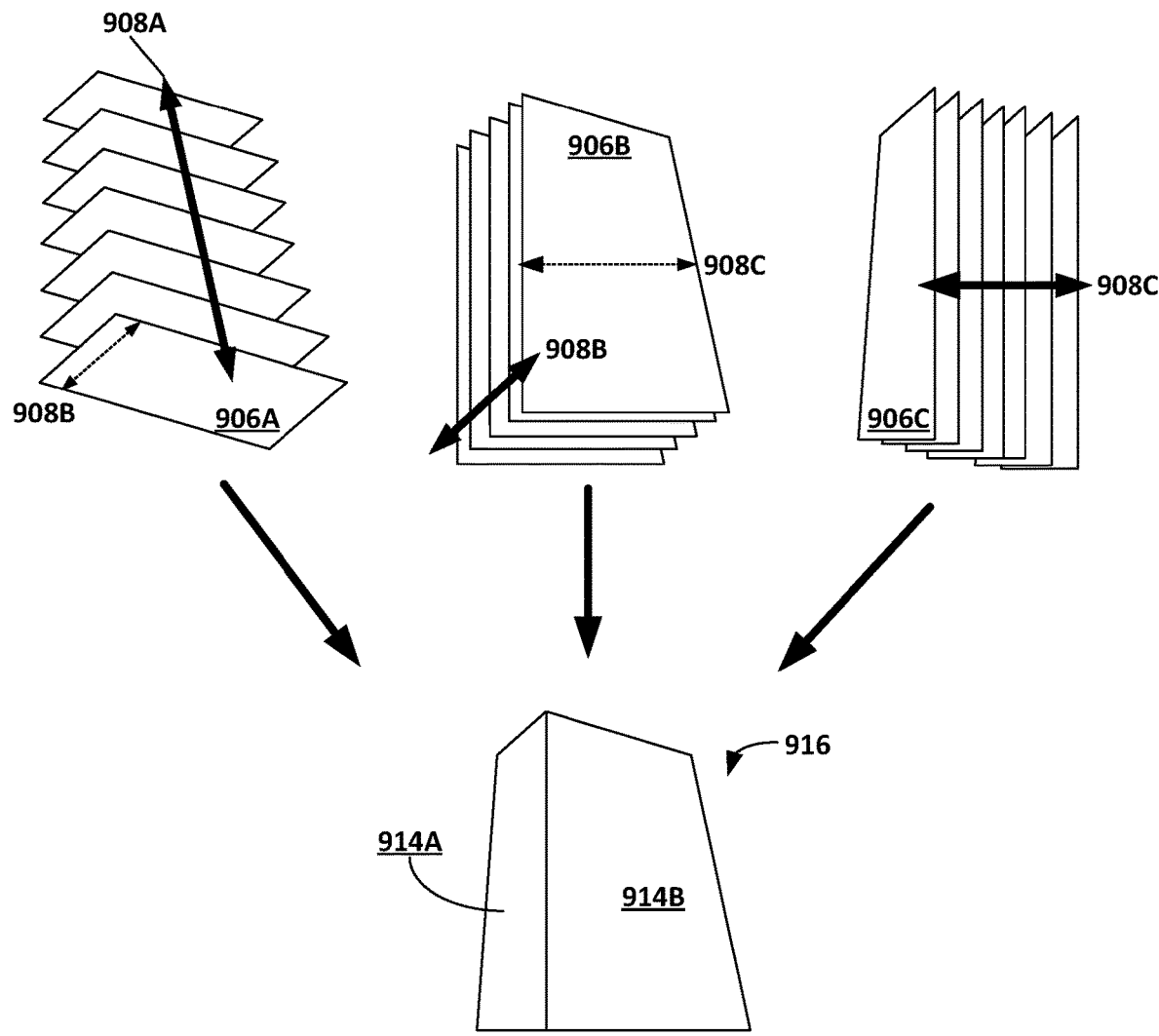
FIG. 10 is a conceptual diagram depicting a method of performing three orthogonal planar sweeps and stitching a set of planes into a 3D global map of a real-world environment, according to techniques of this disclosure.

As shown in FIG. 10, mapping engine 328 may perform multiple planar sweeps along differently oriented axes through 3D point cloud 804. For example, in order to identify approximate planar surfaces 912 (FIG. 9D) oriented along all three spatial dimensions, mapping engine 328 may identify or define a first, a second, and a third imaginary plane 906A-906C, respectively, each imaginary plane 906 being orthogonal to the other two. Similarly, mapping engine 328 may define a respective orthogonal axis 908A-909C along which to sweep the respective imaginary plane 906A-906C. As described above with respect to FIGS. 9A-9D, mapping engine 328 may identify any candidate sets of threshold feature points and/or edges 904, and "collapse" them into cohesive planes 914 and store them within the 3D virtual map (e.g., map data 330 of FIG. 3). In some examples, mapping engine 328 may be configured to perform additional planar sweeps, such as along any other axis (e.g., non-orthogonal axes), in order to identify additional approximate planes 912 and define respective cohesive planes 914.

As further shown in FIG. 10, in some examples mapping engine 328 may be configured to assemble one or more overlapping or intersecting cohesive planes 914A, 914B into a virtual object 916, such as virtual object 120 of FIG. 1, defined by the respective cohesive planes. Mapping engine 328 may be configured to store any or all of the previously identified images 604, feature points 704, ICD pairwise geometries, approximate planes 912, cohesive planes 914 and/or virtual objects 120, 916, etc., as map data 330 stored within memory 304 and/or 314 (FIG. 3). As shown in the example of FIG. 10, virtual object 916 represents a simplified outline of the structure of building 602 (FIG. 6), as defined by the major planes making up its outer surfaces.

In more complex examples in which each 2D image 604 of the triplet of images depicts multiple physical objects 602, mapping engine 328 may repeat the aforementioned processes for each respective physical object 602, resulting in a plurality of graphical objects 926. In either example, mapping engine 328 may generate and store in memory a 3D virtual map composed of cohesive planar surfaces constrained by (e.g., aligned based on) the known positions of the ICDs 208 from the time at which ICDs 208 captured the respective 2D images 604.

Figure 11:
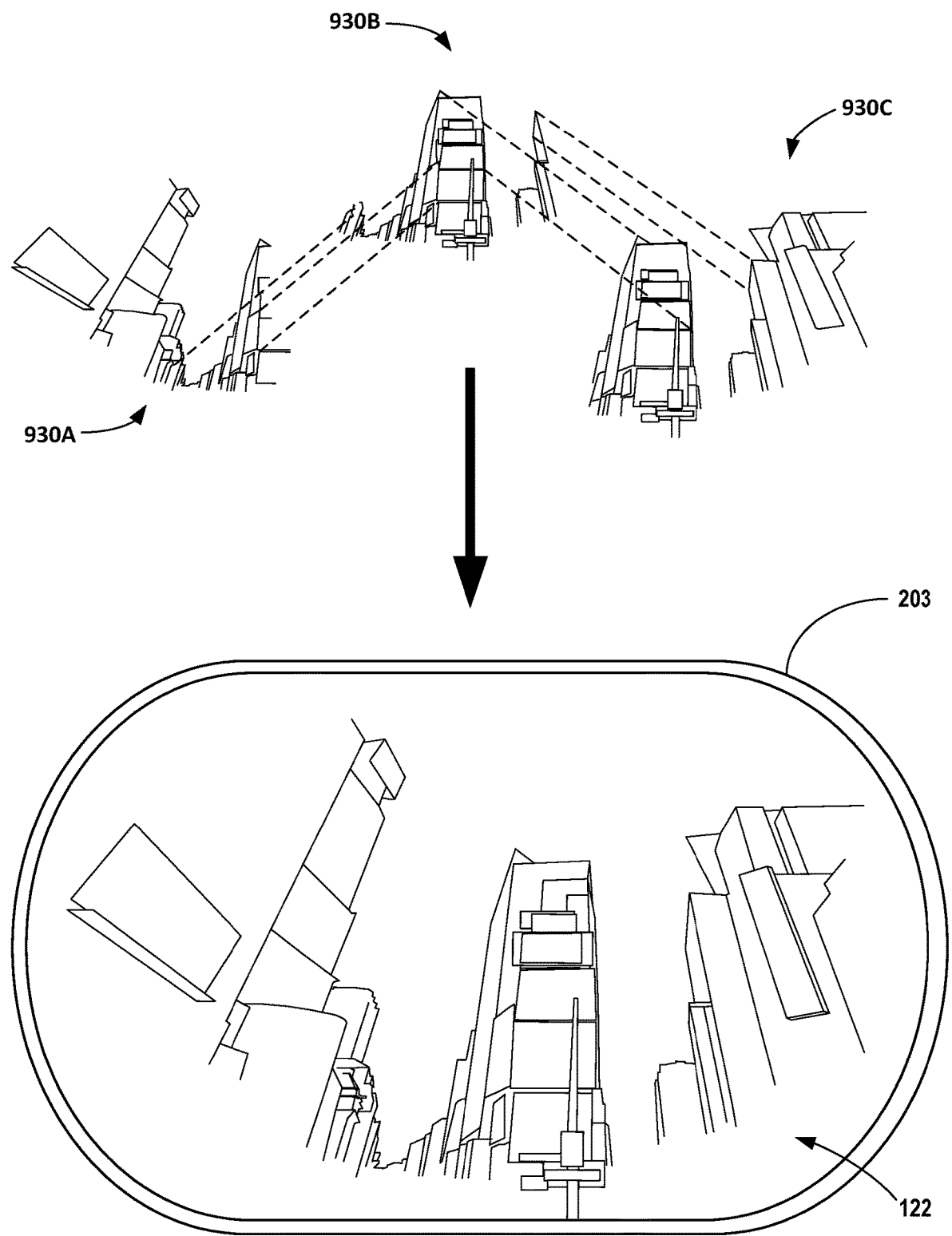
FIG. 11 is a conceptual diagram depicting a method of stitching distinct sets of planar surfaces into a global 3D virtual map, in accordance with techniques of this disclosure.

Mapping engine 328 may be further configured to "stitch" (e.g., align) multiple overlapping sets of images (e.g., sets of triplets) into a single "global" 3D virtual map. For example, FIG. 11 is a conceptual diagram depicting a method of stitching three distinct sets of cohesive planar surfaces 930A-930C into a single global 3D virtual map, in accordance with techniques of this disclosure. For example, mapping engine 328 may have generated first set of cohesive planes 930A from a first triplet of 2D images 604 (FIG. 6), second set of cohesive planes 930B from a second triplet of 2D images 604, and third set of cohesive planes 930C from a third triplet of 2D images 604. Using similar methods as matching feature points between individual 2D images 604, mapping engine 328 may similarly match features of two different sets of cohesive planes 930, or alternatively, between two different 3D point clouds 804, each originating from distinct triplets of images, in order to align corresponding cohesive planes within a common global 3D virtual map. Once mapping engine 328 has constructed a global 3D virtual map by stitching together overlapping cohesive planes and/or point clouds, application engine 320 within console 106 (FIG. 3) or application engine 440 within user device 400 (FIG. 4) may invoke rendering engine 322, 422 to render artificial reality content 122 based on the 3D virtual map, and output the artificial reality content 122 for display to a user, such as on electronic display 203 of HMD 112 (FIG. 2).

Figure 12:
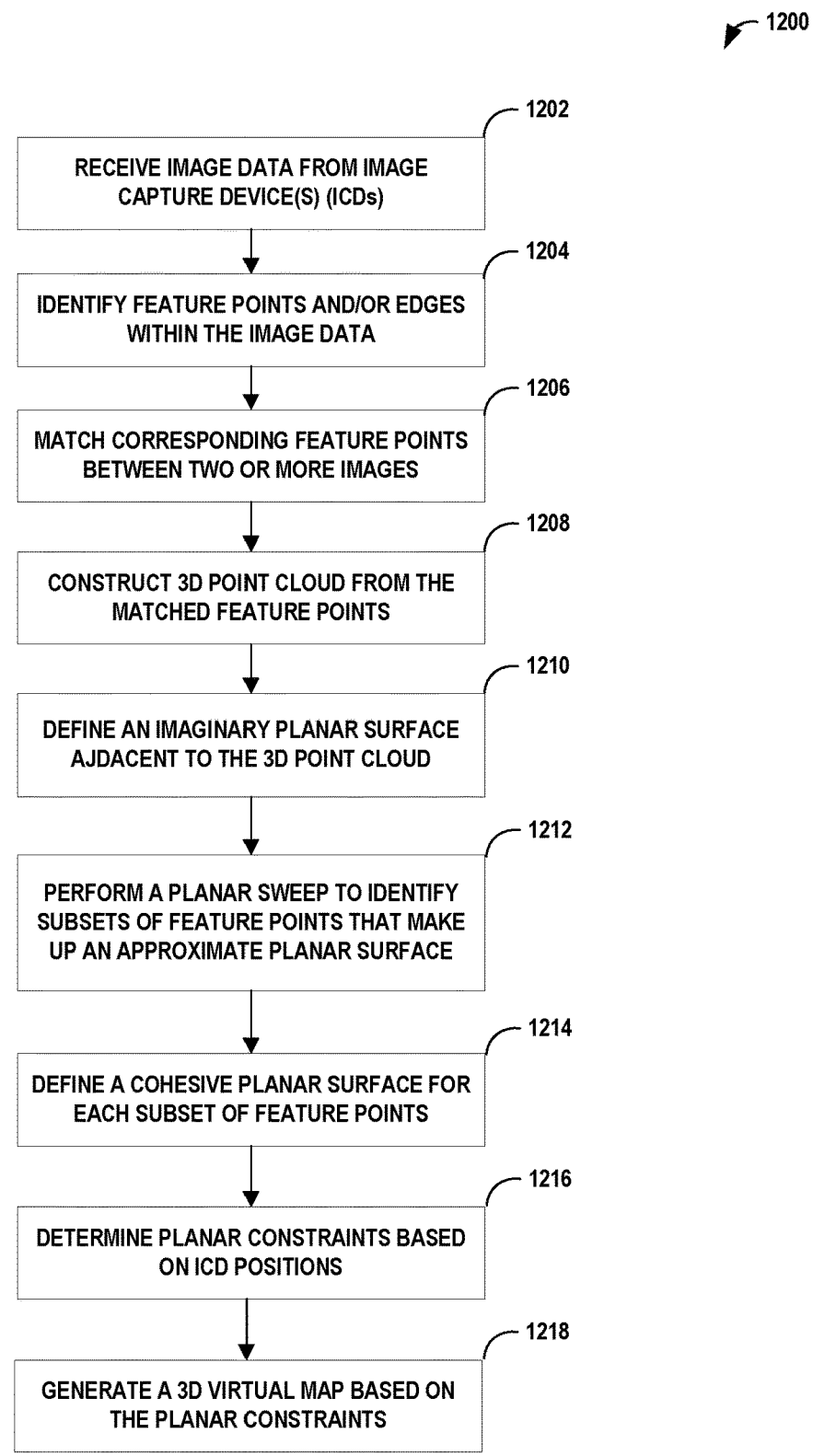
FIG. 12 is a flowchart illustrating an example operation for an artificial reality system configured to construct a global 3D virtual map of a real-world environment.

FIG. 12 is a flowchart illustrating an example operation 1200 for an artificial reality system configured to generate a 3D virtual map of a real-world environment, in accordance with techniques of this disclosure. One or more image capture devices (ICDs) 208, such as a camera built into a head-mounted display (HMD) 112, captures image data in the form of two or more 2D images 604 depicting a real-world environment from multiple locations, angles, and/or depths. A mapping engine 328, such as a set of instructions executed by processing circuitry 302, 312 within HMD 112 or another computing device, receives image data 604 from the ICD(s) 208 (1202).

Mapping engine 328 decomposes the image data into a set of edges and/or feature points 704, such as points representing the intersections of edges within a respective image (1204). Mapping engine 328 may then identify matching or corresponding feature points or edges between two or more different images 604, for example, by comparing feature descriptors of the points, the relative locations of the points, or in some examples, based on the known positions and/or orientations of the ICDs 208 when the ICDs 208 captured the images (1206). Based on the change in relative positions of different matched feature points between two or more 2D images 604, mapping engine 328 may determine a set of 3D spatial relationships between the feature points 704 and construct a 3D point cloud 804 indicating the relative spatial relationships between matched feature points 704 along a three-dimensional coordinate system constrained by the known ICD locations (1208).

Mapping engine 328 may define an arbitrary or imaginary planar surface 906 oriented adjacent to 3D point cloud 804 (1210). For example, mapping engine 328 may determine an orientation for a planar surface 906 by performing a vanishing-point analysis on images 604 or feature points 704 to identify lines or edges that indicate a major (e.g., relatively common) orientation for different planar surfaces within the images 604. In another example, mapping engine 328 may identify a horizontal "ground" or "floor" within images 604 based on a gravity vector indicated by IMU metadata stored alongside images 604, and may orient an imaginary planar surface 906 parallel to the ground or floor.

Mapping engine 328 may then perform a "planar sweep" by theoretically dragging the imaginary planar surface 906 along an axis 908 orthogonal to itself, in order to identify one or more subsets of feature points 904 making up approximate planar surfaces 912 that are generally parallel to the imaginary planar surface 906 performing the planar sweep (1212). In some examples, mapping engine 328 may perform multiple planar sweeps, each planar sweep along a different (e.g., orthogonal) axis, in order to identify further approximate planar surfaces 912 from within 3D point cloud 804.

For each identified subset of feature points 904 making up an approximate planar surface 912, mapping engine computes, generates, or defines a single "cohesive" planar surface 914 representing the subset of points (1214). For example, mapping engine 328 may identify a "smooth" plane 914 that best fits each subset of feature points 904, in order to average-out the random variation in the feature points' positions and to simplify any further computations or operations based on the subset of points.

Mapping engine 328 may then determine planar constraints of each cohesive plane 914 based on a distance between the cohesive planar surface 914 and the ICDs when they captured the original 2D image data (1216). Mapping engine 328 may then generate a 3D virtual map based on the planar constraints (1218). More specifically, mapping engine 328 may constrain (e.g., determine an alignment) of each cohesive plane 914 relative to the others, according to the 3D spatial coordinates based on the planar constraints, in order to generate the 3D virtual map, composed of the aligned cohesive planes, corresponding to the real-world environment depicted in the original 2D image data. In some examples, a rendering engine may render artificial reality content based on the 3D virtual map, and output the artificial reality content for display on a screen, such as display 203 of HMD 112 (FIG. 2A).

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. An artificial reality (AR) system comprising:
   at least one image capture device configured to capture image data representative of a real world environment; and
   a mapping engine configured to:
   construct a 3D point cloud comprising a plurality of points from the image data;

define a cohesive planar surface based on a subset of points of the plurality of points;
determine planar constraints based on a distance between the at least one image capture device and the cohesive planar surface; and
generate a 3D virtual map of the real world environment based at least in part on the planar constraints.

2. The system of claim 1, wherein, to construct the 3D point cloud, the mapping engine is configured to:
receive a first set of two or more images from the at least one image capture device, wherein the two or more images within the first set at least partially overlap;
identify common points within the first set of images; and
construct the 3D point cloud from the common points within the first set of images.

3. The system of claim 2, wherein the mapping engine defines the cohesive planar surface based on the common points within the first set of images, and wherein the mapping engine is further configured to stitch together two or more sets of images into a global image used to generate the 3D virtual map.

4. The system of claim 3, wherein, to stitch together the two or more sets of images, the mapping engine is configured to match common points between the sets of images.

5. The system of claim 3, wherein, to stitch together the two or more sets of images, the mapping engine is configured to match overlapping portions of planar surfaces between the sets of images.

6. The system of claim 1, wherein the cohesive planar surface comprises a first cohesive planar surface, wherein the subset of points comprises a first subset of points, and wherein the mapping engine is further configured to:
define a first planar surface and a first axis orthogonal to the first planar surface;
perform a planar sweep of the first planar surface along the first axis through the plurality of points to identify the first subset of points that intersect with the first planar surface; and
define the first cohesive planar surface based on the first subset of points.

7. The system of claim 6, wherein the planar constraints comprise first planar constraints, and wherein the mapping engine is further configured to:
define a second planar surface orthogonal to the first planar surface and a second axis orthogonal to the first axis and to the second planar surface;
perform a second planar sweep of the second planar surface along the second axis to identify a second subset of points that intersect with the second planar surface;
define a second cohesive planar surface based on the second subset of points, wherein the second cohesive planar surface is orthogonal to the first cohesive planar surface;
determine second planar constraints based on a distance between the at least one image capture device and the second cohesive planar surface; and
generate the 3D virtual map of the real world environment based at least in part on the first planar constraints and the second planar constraints.

8. The system of claim 7, wherein the mapping engine is further configured to:
define a third planar surface orthogonal to the first planar surface and to the second planar surface;
perform a third planar sweep along a third axis orthogonal to the first axis and to the second axis to identify a third subset of points that intersect with the third planar surface;
define a third cohesive planar surface based on the third subset of points, wherein the third cohesive planar surface is orthogonal to the first cohesive planar surface and to the second cohesive planar surface;
determine third planar constraints based on a distance between the at least one image capture device and the third cohesive planar surface; and
generate the 3D virtual map of the real world environment based on the first planar constraints, the second planar constraints, and the third planar constraints.

9. The system of claim 6, wherein defining the first planar surface comprises performing a vanishing-point analysis on the image data.

10. The system of claim 1, further comprising:
a head-mounted display (HMD) configured to output artificial reality content; and
a rendering engine configured to render the artificial reality content corresponding to the 3D virtual map for display on the HMD.

11. The system of claim 1, wherein each point of the plurality of points comprises an intersection of two lines, an external surface, or an edge.

12. The system of claim 1, wherein, to define the cohesive planar surface, the mapping engine is configured to compute a weighted average of distances of each point of the subset of points from an arbitrary plane, as measured along a respective line tangent to the arbitrary plane.

13. A method comprising:
constructing, by a mapping engine, a 3D point cloud comprising a plurality of points from image data representing a real-world environment;
defining a cohesive planar surface based on a subset of points of the plurality of points;
determining planar constraints based on a distance between the at least one image capture device and the cohesive planar surface; and
generating a 3D virtual map of the real world environment based at least in part on the planar constraints.

14. The method of claim 13, wherein constructing the 3D point cloud comprises:
receiving a first set of two or more images from the at least one image capture device, wherein the two or more images within the first set at least partially overlap;
identifying common points within the first set of images; and
constructing the 3D point cloud from the common points within the first set of images.

15. The method of claim 14, wherein defining the cohesive planar surface comprises defining the cohesive planar surface based on the common points within the first set of images, the method further comprising stitching together two or more sets of images into a global image used to generate the 3D virtual map.

16. The method of claim 13, wherein the subset of points comprises a first subset of points, the cohesive planar surface comprises a first cohesive planar surface, and the planar constraints comprise first planar constraints, the method further comprising:
defining a second cohesive planar surface based on a second subset of points of the plurality of points, wherein the second cohesive planar surface is orthogonal to the first cohesive planar surface; and determining second planar constraints based on a distance between the at least one image capture device and the second cohesive planar surface, wherein generating the 3D virtual map comprises generating a 3D virtual map of the real world environment based at least in part on the first planar constraints and the second planar constraints.

17. The method of claim 16, further comprising:

defining a third cohesive planar surface based on a third subset of points of the plurality of points, wherein the third cohesive planar surface is orthogonal to the first cohesive planar surface and to the second cohesive planar surface; and determining third planar constraints based on a distance between the at least one image capture device and the third cohesive planar surface, wherein generating the 3D virtual map comprises generating a 3D virtual map of the real world environment based at least in part on the first planar constraints, the second planar constraints, and the third planar constraints.

18. The method of claim 13, further comprising:
rendering, by a rendering engine, artificial reality content corresponding to the 3D virtual map; and
outputting for display the artificial reality content.

19. The method of claim 13, wherein defining the cohesive planar surface comprises computing a weighted average of distances of each point in the subset of points from an arbitrary plane, as measured along a respective line tangent to the arbitrary plane.

20. A non-transitory computer-readable medium comprising instructions for causing one or more processors of an artificial reality system to perform operations comprising:

constructing, by a mapping engine, a 3D point cloud comprising a plurality of points from image data representing a real-world environment;

defining a cohesive planar surface based on a subset of points of the plurality of points;

determining planar constraints based on a distance between the at least one image capture device and the cohesive planar surface; and generating a 3D virtual map of the real world environment based at least in part on the planar constraints.

* * * * *